US011914380B2

(12) United States Patent
Aizawa et al.

(10) Patent No.: US 11,914,380 B2
(45) Date of Patent: Feb. 27, 2024

(54) SYSTEM INCLUDING CONVEYANCE VEHICLE AND WORK MACHINE THAT LOADS MATERIALS ONTO CONVEYANCE VEHICLE, METHOD AND WORK MACHINE

(71) Applicant: KOMATSU LTD., Tokyo (JP)

(72) Inventors: Masanori Aizawa, Tokyo (JP); Kenjiro Shimada, Tokyo (JP)

(73) Assignee: KOMATSU LTD., Tokyo (JP)

( * ) Notice: Subject to any disclaimer, the term of this patent is extended or adjusted under 35 U.S.C. 154(b) by 655 days.

(21) Appl. No.: 17/264,116

(22) PCT Filed: Sep. 18, 2019

(86) PCT No.: PCT/JP2019/036532
§ 371 (c)(1),
(2) Date: Jan. 28, 2021

(87) PCT Pub. No.: WO2020/075458
PCT Pub. Date: Apr. 16, 2020

(65) Prior Publication Data
US 2021/0165414 A1 Jun. 3, 2021

(30) Foreign Application Priority Data

Oct. 10, 2018 (JP) .................. 2018-191789

(51) Int. Cl.
*G05D 1/02* (2020.01)
*E02F 9/20* (2006.01)
(Continued)

(52) U.S. Cl.
CPC ........... *G05D 1/0214* (2013.01); *E02F 9/205* (2013.01); *E02F 9/26* (2013.01); *E02F 9/261* (2013.01);
(Continued)

(58) Field of Classification Search
CPC ............... G05D 1/0214; G05D 1/0291; G05D 2201/0202; E02F 9/205; E02F 9/26;
(Continued)

(56) References Cited

U.S. PATENT DOCUMENTS 4,027,772 A 6/1977 Garber
2012/0136509 A1 5/2012 Everett et al.
(Continued)

FOREIGN PATENT DOCUMENTS

CN 104541250 A 4/2015
JP 9-86262 A 3/1997
(Continued)

OTHER PUBLICATIONS

Jongluxmanee et al, J. Improved Soil Shape on the Dump Truck for Soil Loading Operation of Excavator, Proceedings of the IEEE/ASME International Conference on Advanced Intelligent Mechatronics, Hong Kong, China, Jul. 2019, pp. 845-850. (Year: 2019).*
(Continued)

*Primary Examiner* — Russell Frejd
(74) *Attorney, Agent, or Firm* — Global IP Counselors, LLP

(57) ABSTRACT

A system includes a conveyance vehicle, and a work machine that loads materials onto the conveyance vehicle. A first processor of a work machine determines a target stop position of a conveyance vehicle based on a position of the work machine, a target offset distance, and the direction of the loading position. A second processor of the conveyance vehicle acquires data indicative of the target stop position of the conveyance vehicle from the work machine. The second processor controls the conveyance vehicle to move the conveyance vehicle to the target stop position.

18 Claims, 18 Drawing Sheets

(51) Int. Cl.
*E02F 9/26* (2006.01)
*B60P 1/16* (2006.01)
*E02F 3/32* (2006.01)
*E02F 9/22* (2006.01)
*G05D 1/00* (2006.01)

(52) U.S. Cl.
CPC ............... *B60P 1/162* (2013.01); *E02F 3/32* (2013.01); *E02F 9/2235* (2013.01); *E02F 9/2296* (2013.01); *G05D 2201/0202* (2013.01)

(58) Field of Classification Search
CPC ....... E02F 9/261; E02F 9/2235; E02F 9/2296; E02F 9/282; E02F 9/287; E02F 3/32; E02F 3/437; B60P 1/162
See application file for complete search history.

(56) References Cited

U.S. PATENT DOCUMENTS

| | | | | |
|---|---|---|---|---|
| 2014/0019042 | A1* | 1/2014 | Sugawara | G01S 19/45 701/431 |
| 2014/0039767 | A1* | 2/2014 | Jensen | B60K 23/0808 701/50 |
| 2014/0107882 | A1 | 4/2014 | Tojima et al. | |
| 2014/0261152 | A1 | 9/2014 | Tanaka et al. | |
| 2015/0170441 | A1 | 6/2015 | Kimura | |
| 2017/0315561 | A1 | 11/2017 | Kadono et al. | |
| 2021/0310213 | A1* | 10/2021 | Aizawa | E02F 3/439 |

FOREIGN PATENT DOCUMENTS

| | | |
|---|---|---|
| JP | 2000-192514 A | 7/2000 |
| JP | 2013-2161 A | 1/2013 |
| WO | 2013/058247 A1 | 4/2013 |
| WO | 2014/119711 A1 | 8/2014 |
| WO | 2015/151359 A1 | 10/2015 |
| WO | 2016/167375 A1 | 10/2016 |

OTHER PUBLICATIONS

Office Action for the corresponding Chinese application No. 201980045277.7, dated Jan. 6, 2022.

The International Search Report for the corresponding international application No. PCT/JP2019/036532, dated Dec. 3, 2019.

* cited by examiner

SYSTEM INCLUDING CONVEYANCE VEHICLE AND WORK MACHINE THAT LOADS MATERIALS ONTO CONVEYANCE VEHICLE, METHOD AND WORK MACHINE

CROSS-REFERENCE TO RELATED APPLICATIONS

This application is a U.S. National stage application of International Application No. PCT/JP2019/036532, filed on Sep. 18, 2019. This U.S. National stage application claims priority under 35 U.S.C. § 119(a) to Japanese Patent Application No. 2018-191789, filed in Japan on Oct. 10, 2018, the entire contents of which are hereby incorporated herein by reference.

BACKGROUND

Field of the Invention

The present invention relates to a technique for controlling a conveyance vehicle and a work machine that loads materials onto the conveyance vehicle.

Background Information

There is work which involves digging materials such as soil and the like by a work machine such as a hydraulic excavator and loading the materials onto a conveyance vehicle such as a dump truck. The conveyance vehicle is loaded with the materials at a predetermined loading position. The conveyance vehicle travels to a predetermined dumping position and dumps the materials at the dumping position. The conveyance vehicle then returns to the loading position and materials are loaded again by the work machine onto the conveyance vehicle.

Conventionally, a technique for performing the above loading work by the work machine with automatic control is known. For example, Japanese Patent Laid-Open No. 2000-192514 indicates that the digging position and the unloading position are previously learned by a controller of the work machine. The controller controls the work machine so as to perform digging at the digging position, cause the work machine to rotate from the digging position toward the unloading position, and unload materials at the unloading position.

SUMMARY

According to the above technique, the loading work can be performed by the work machine with automatic control. However, the loading work is performed not only by the work machine but also in cooperation with the conveyance vehicle. Therefore, it is important to perform the work while appropriately coordinating the work machine and the conveyance vehicle in order to efficiently perform the loading work.

An object of the present invention is to perform loading work onto the conveyance vehicle by the work machine with automatic control and appropriately coordinate the work machine and the conveyance vehicle.

A system according to a first aspect is a system including a conveyance vehicle and a work machine that loads materials onto the conveyance vehicle. The work machine includes a first position sensor and a first processor. The first position sensor detects a position of the work machine. The first processor acquires data indicative of the position of the work machine detected by the first position sensor. The first processor acquires data indicative of a target offset distance of the conveyance vehicle with respect to the work machine. The first processor determines a target stop position of the conveyance vehicle based on the position of the work machine and the target offset distance. The conveyance vehicle includes a communication device, a second position sensor, and a second processor. The communication device communicates with the work machine. The second position sensor detects a position of the conveyance vehicle. The second processor acquires data indicative of the target stop position from the work machine. The second processor controls the conveyance vehicle so as to move the conveyance vehicle to the target stop position.

A method according to a second aspect is a method executed by one or more processors in order to control a conveyance vehicle and a work machine that loads materials onto the conveyance vehicle. The method includes the following processes. A first process is to acquire data indicative of a position of the work machine. A second process is to acquire data indicative of a target offset distance of the conveyance vehicle with respect to the work machine. A third process is to determine a target stop position of the conveyance vehicle based on the position of the work machine and the target offset distance. A fourth process is to acquire data indicative of a position of the conveyance vehicle. A fifth process is to control the conveyance vehicle so as to move the conveyance vehicle to the target stop position.

A work machine according to a third aspect is a work machine including a first position sensor, a first processor, and a communication device. The first position sensor detects a position of the work machine. The first processor acquires data indicative of the position of the work machine detected by the first position sensor. The first processor acquires data indicative of a target offset distance of a conveyance vehicle with respect to the work machine. The first processor determines a target stop position of the conveyance vehicle based on the position of the work machine and the target offset distance. The communication device transmits the target stop position to the conveyance vehicle.

According to the present invention, the target stop position of the conveyance vehicle is determined based on the position of the work machine and the target offset distance. Further, the conveyance vehicle is controlled so as to move to the target stop position. As a result, it is possible to perform loading work onto the conveyance vehicle by the work machine with the automatic control and appropriately coordinate the work machine and the conveyance vehicle.

DETAILED DESCRIPTION OF EMBODIMENT(S)

Figure 1:
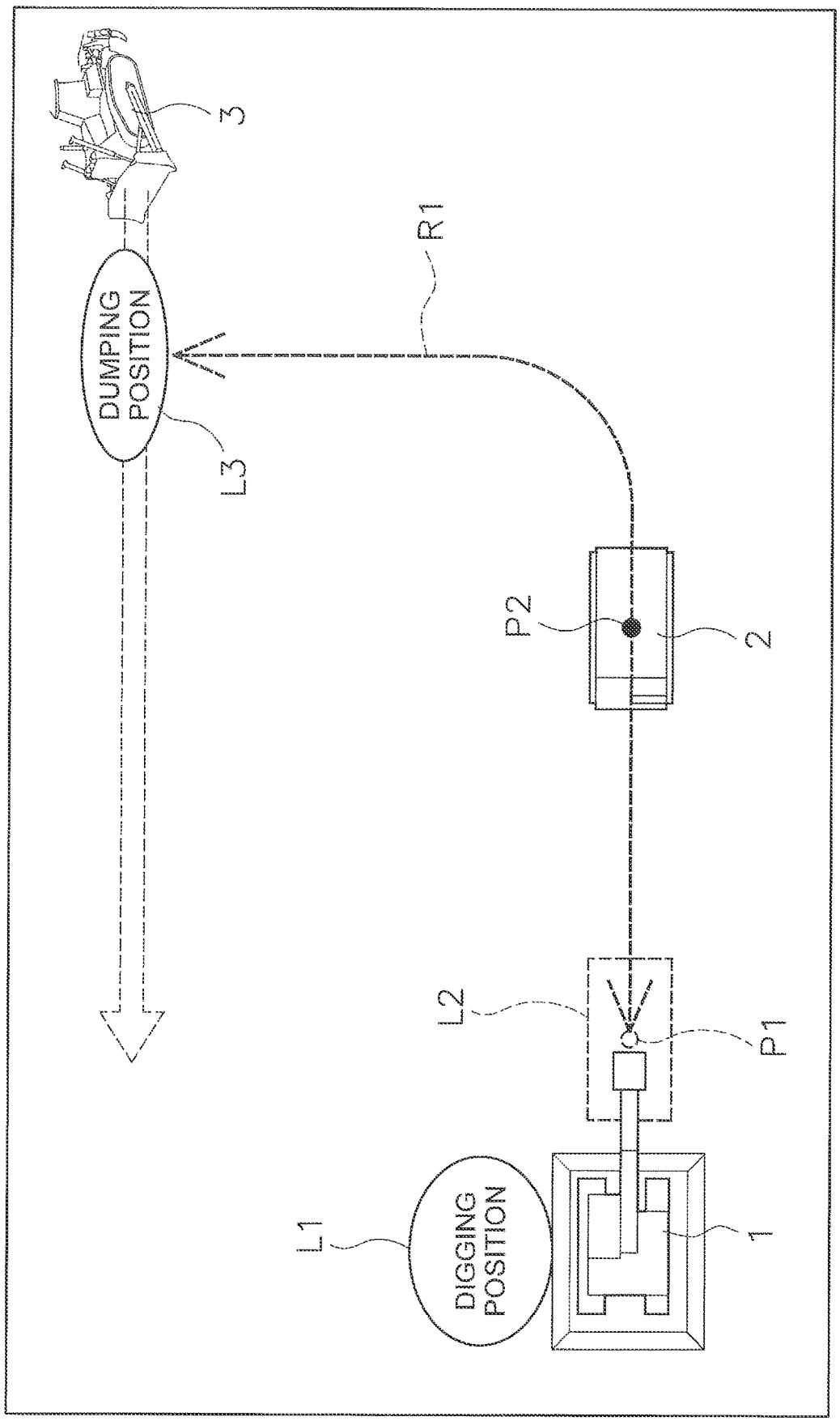
FIG. 1 is a plan view illustrating an example of a work site where a work machine and a conveyance vehicle are used.

A control system of a work machine and a conveyance vehicle according to an embodiment will now be described with reference to the drawings. FIG. 1 is a plan view illustrating an example of a work site where a work machine 1 and a conveyance vehicle 2 according to the embodiment are used. The work machine 1 and the conveyance vehicle 2 are disposed at the work site. The work machine 1 and the conveyance vehicle 2 perform work in cooperation with each other under automatic control.

In the present embodiment, the work machine 1 is a hydraulic excavator. The conveyance vehicle 2 is a dump truck. The work machine 1 is disposed beside a predetermined digging position L1 in the work site. The conveyance vehicle 2 travels back and forth between a predetermined loading position L2 and a predetermined dumping position L3 in the work site. The work machine 1 digs the digging position L1 with automatic control and loads materials such as soil and the like as an object to be dug onto the conveyance vehicle 2 that is stopped at the loading position L2. The conveyance vehicle 2 loaded with the materials travels to the dumping position L3 and unloads the materials at the dumping position L3. Another work machine 3 such as a bulldozer is disposed at the dumping position L3 and spreads the materials unloaded at the dumping position L3. The conveyance vehicle 2 that has unloaded the materials travels to the loading position L2, and the work machine 1 again loads the materials onto the conveyance vehicle 2 that is stopped at the loading position L2. The materials of the digging position L1 are transported to the dumping position L3 by repeating the above work.

Figure 2:
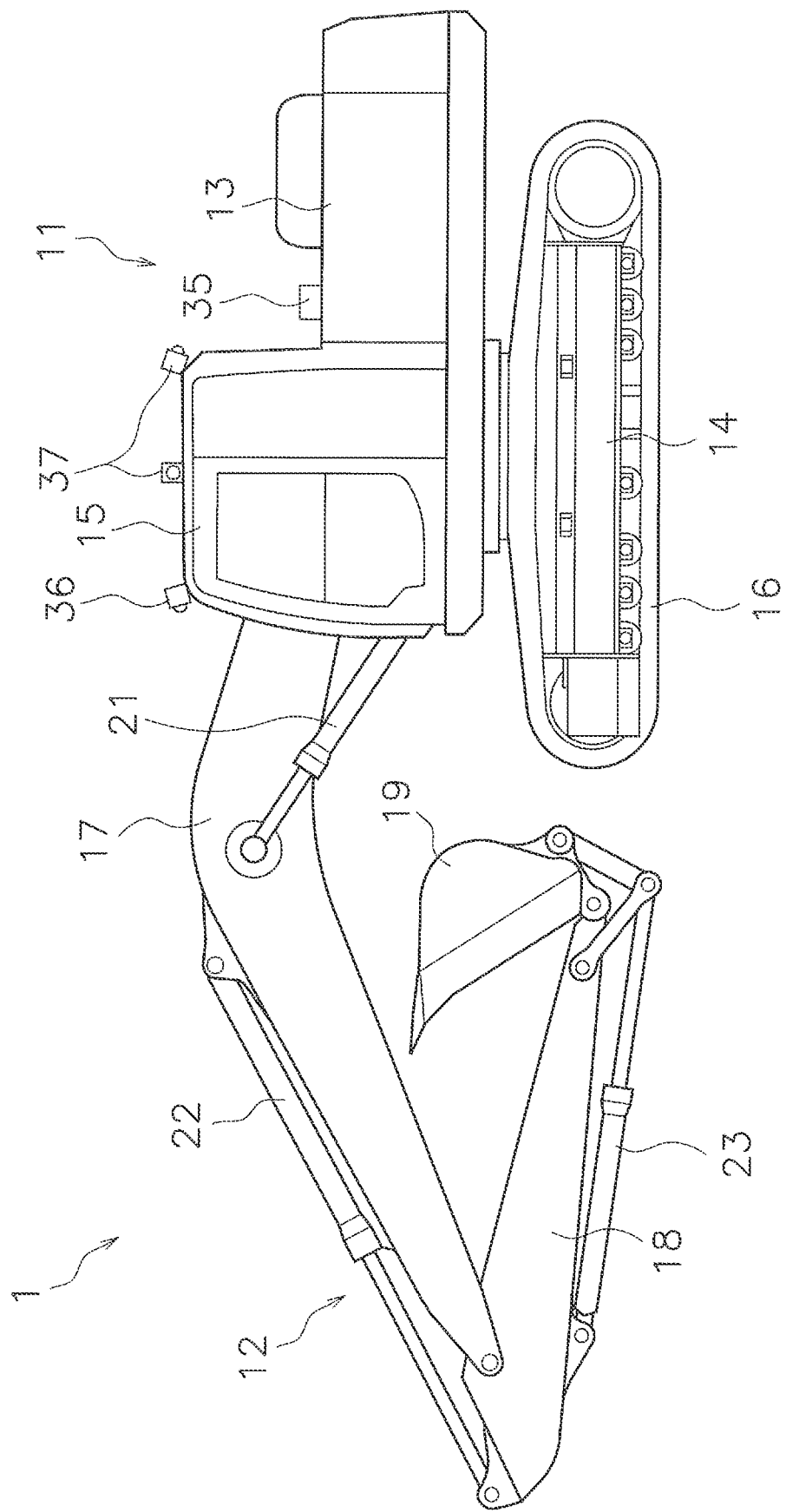
FIG. 2 is a side view of the work machine.

FIG. 2 is a side view of the work machine 1. As illustrated in FIG. 2, the work machine 1 includes a vehicle body 11 and a work implement 12. The vehicle body 11 includes a rotating body 13 and a support body 14. The rotating body 13 is rotatably attached to the support body 14. A cab 15 is disposed on the rotating body 13. However, the cab 15 may be omitted. The support body 14 includes crawler belts 16. The crawler belts 16 are driven by driving force of an engine 24 described later, whereby the work machine 1 travels.

The work implement 12 is attached to the front part of the vehicle body 11. The work implement 12 includes a boom 17, an arm 18, and a bucket 19. The boom 17 is attached to the rotating body 13 so as to allow movement in the up and down direction. The arm 18 is movably attached to the boom 17. The bucket 19 is movably attached to the arm 18. The work implement 12 includes a boom cylinder 21, an arm cylinder 22, and a bucket cylinder 23. The boom cylinder 21, the arm cylinder 22, and the bucket cylinder 23 are hydraulic cylinders and are driven by hydraulic fluid supplied from a hydraulic pump 25 described later. The boom cylinder 21 actuates the boom 17. The arm cylinder 22 actuates the arm 18. The bucket cylinder 23 actuates the bucket 19.

Figure 3:
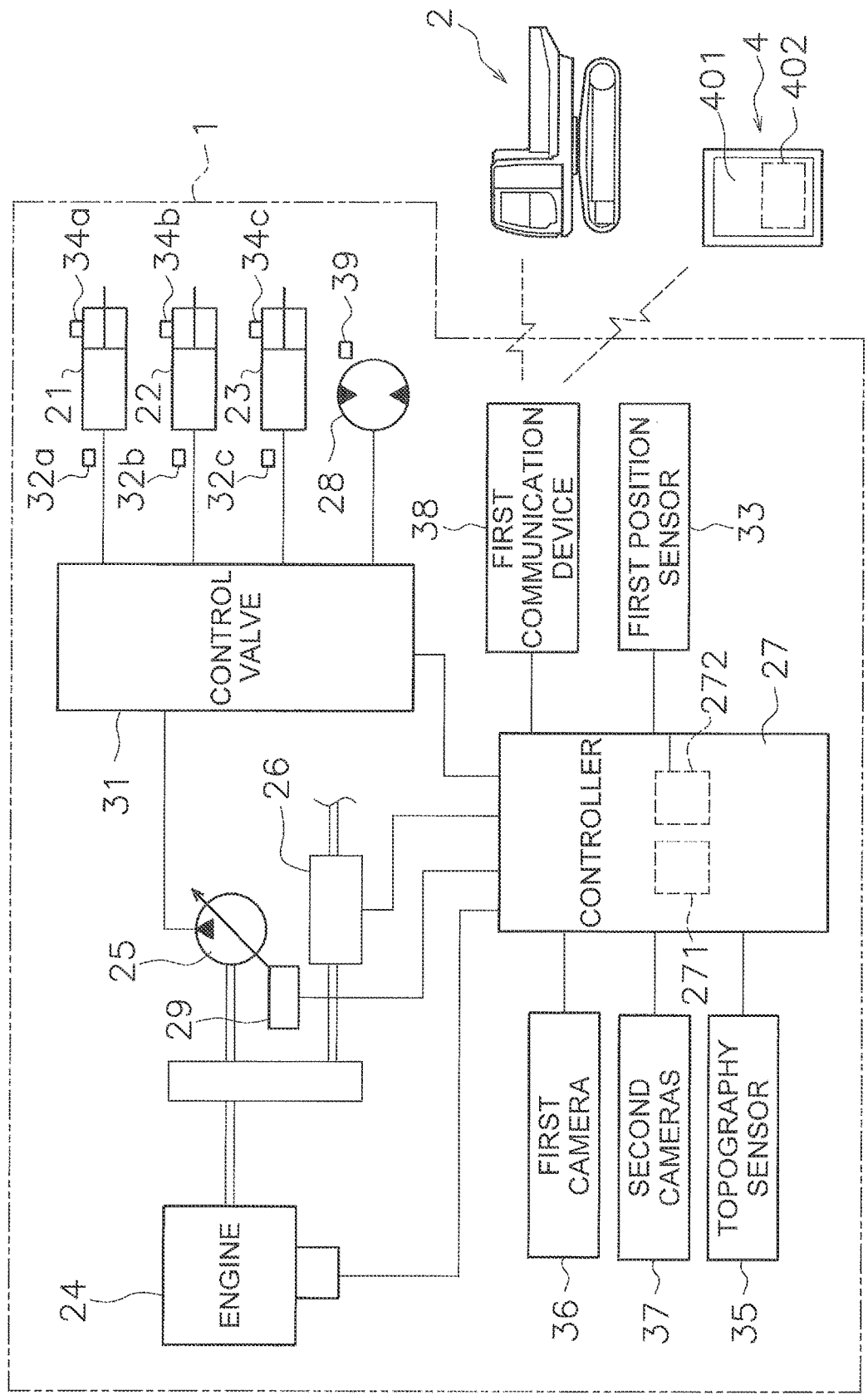
FIG. 3 is a block diagram illustrating a configuration of the work machine.

FIG. 3 is a block diagram illustrating a configuration of a control system of the work machine 1. As illustrated in FIG. 3, the work machine 1 includes an engine 24, a hydraulic pump 25, a power transmission device 26, and a controller 27.

The engine 24 is controlled by command signals from the controller 27. The hydraulic pump 25 is driven by the engine 24 to discharge hydraulic fluid. The hydraulic fluid discharged from the hydraulic pump 25 is supplied to the boom cylinder 21, the arm cylinder 22, and the bucket cylinder 23.

The work machine 1 includes a rotation motor 28. The rotation motor 28 is a hydraulic motor and is driven by hydraulic fluid from the hydraulic pump 25. The rotation motor 28 rotates the rotating body 13. The hydraulic pump 25 is a variable displacement pump. Although one hydraulic pump 25 is illustrated in FIG. 3, a plurality of hydraulic pumps may be included. A pump control device 29 is connected to the hydraulic pump 25. The pump control device 29 controls the inclination angle of the hydraulic pump 25. The pump control device 29 includes, for example, an electromagnetic valve and is controlled by command signals from the controller 27. The controller 27 controls the displacement of the hydraulic pump 25 by controlling the pump control device 29.

The hydraulic pump 25, the cylinders 21 to 23, and the rotation motor 28 are connected to each other by means of a hydraulic circuit via a control valve 31. The control valve 31 is controlled by command signals from the controller 27. The control valve 31 controls the flow rate of hydraulic fluid supplied from the hydraulic pump 25 to the cylinders 21 to 23 and the rotation motor 28. The controller 27 controls the operation of the work implement 12 by controlling the control valve 31. The controller 27 also controls the rotation of the rotating body 13 by controlling the control valve 31.

The power transmission device 26 transmits driving force of the engine 24 to the support body 14. The power transmission device 26 may be, for example, a torque converter or a transmission having a plurality of transmission gears. Alternatively, the power transmission device 26 may be another type of transmission such as a hydro static transmission (HST) or a hydraulic mechanical transmission (HMT).

The controller 27 is programmed so as to control the work machine 1 based on acquired data. The controller 27 causes the work machine 1 to travel by controlling the engine 24, the support body 14, and the power transmission device 26. The controller 27 causes the work implement 12 to operate by controlling the engine 24, the hydraulic pump 25, and the control valve 31.

The controller 27 includes a first processor 271 such as a CPU or a GPU, and a memory 272. The first processor 271 performs a process for automatic control of the work machine 1. The memory 272 stores data and programs for the automatic control of the work machine 1. For example, the memory 272 includes a volatile memory and a non-volatile memory.

The work machine 1 includes load sensors 32a to 32c. The load sensors 32a to 32c detect a load applied to the work implement 12 and output load data indicative of the load. In the present embodiment, the load sensors 32a to 32c are hydraulic pressure sensors and detect each hydraulic pressure of the cylinders 21 to 23. The load data indicates the hydraulic pressures of the cylinders 21 to 23. The controller 27 is communicatably connected to the load sensors 32a to 32c by wire or wirelessly. The controller 27 receives the load data from the load sensors 32a to 32c.

The work machine 1 includes a first position sensor 33, work implement sensors 34a to 34c, and a rotation angle sensor 39. The first position sensor 33 detects a position of the work machine 1 and outputs position data indicative of the position of the work machine 1. The first position sensor 33 includes a global navigation satellite system (GNSS) receiver and an inertial measurement unit (IMU). The GNSS receiver is, for example, a receiver for a global positioning system (GPS). The position data includes data indicative of the position of the work machine 1 output by the GNSS receiver and data indicative of a posture of the vehicle body 11 output by the IMU. The posture of the vehicle body 11, for example, includes an angle (pitch angle) with respect to the horizontal in the longitudinal direction of the work machine 1 and an angle (roll angle) with respect to the horizontal in the lateral direction of the work machine 1.

The work implement sensors 34a to 34c detects a posture of the work implement 12 and output posture data indicative of the posture of the work implement 12. The work implement sensors 34a to 34c are, for example, stroke sensors that detect the stroke amounts of the cylinders 21 to 23. The posture data of the work implement 12 includes the stroke amounts of the cylinders 21 to 23. Alternatively, the work implement sensors 34a to 34c may be other sensors such as sensors that detect each rotation angle of the boom 17, the arm 18, and the bucket 19. The rotation angle sensor 39 detects the rotation angle of the rotating body 13 with respect to the support body 14 and outputs rotation angle data indicative of the rotation angle.

The controller 27 is communicatably connected to the first position sensor 33, the work implement sensors 34a to 34c, and the rotation angle sensor 39 by wire or wirelessly. The controller 27 receives the position data of the work machine 1, the posture data of the work implement 12, and the rotation angle data from the first position sensor 33, the work implement sensors 34a to 34c, and the rotation angle sensor 39, respectively. The controller 27 calculates a blade tip position of the bucket 19 from the position data, the posture data, and the rotation angle data. For example, the position data of the work machine 1 indicates the global coordinates of the first position sensor 33. The controller 27 calculates the global coordinates of the blade tip position of the bucket 19 from the global coordinates of the first position sensor 33 based on the posture data of the work implement 12 and the rotation angle data.

The work machine 1 includes a topography sensor 35. The topography sensor 35 measures a topography at the surroundings of the work machine 1 and outputs topography data indicative of the topography measured by the topography sensor 35. In the present embodiment, the topography sensor 35 is attached to a side part of the rotating body 13. The topography sensor 35 measures the topography located to the side of the rotating body 13. The topography sensor 35 is, for example, a laser imaging detection and ranging (LIDAR) device. The LIDAR device measures distances to a plurality of measurement points on the topography by irradiating a laser and measuring the reflected light thereof. The topography data indicates the positions of the measurement points with respect to the work machine 1.

The work machine 1 includes a first camera 36 and a plurality of the second cameras 37. The first camera 36 is facing forward from the rotating body 13 and is attached to the rotating body 13. The first camera 36 captures toward the front of the rotating body 13. The first camera 36 is a stereo camera. The first camera 36 outputs first image data indicative of the captured moving images.

The plurality of second cameras 37 are facing left, right, and rear from the rotating body 13 and are attached to the rotating body 13. The second cameras 37 output second image data indicative of the captured moving images. The second cameras 37 may be single-lens cameras. Alternatively, the second cameras 37 may be stereo cameras in the same way as the first camera 36. The controller 27 is communicatably connected to the first camera 36 and the second cameras 37 by wire or wirelessly. The controller 27 receives the first image data from the first camera 36. The controller 27 receives the second image data from the second cameras 37.

The work machine 1 includes a first communication device 38. The first communication device 38 performs data communication with a device outside the work machine 1. The first communication device 38 communicates with a remote computer device 4 outside the work machine 1. The remote computer device 4 may be disposed at the work site. Alternatively, the remote computer device 4 may be disposed at a management center remote from the work site. The remote computer device 4 includes a display 401 and an input device 402.

The display 401 displays images related to the work machine 1. The display 401 displays images corresponding to signals received from the controller 27 via the first communication device 38. The input device 402 is operated by an operator. The input device 402 may include, for example, a touch screen or may include hardware keys. The remote computer device 4 transmits signals indicative of commands input by the input device 402 to the controller 27 via the first communication device 38. The first communication device 38 also performs data communication with the conveyance vehicle 2.

Figure 4:
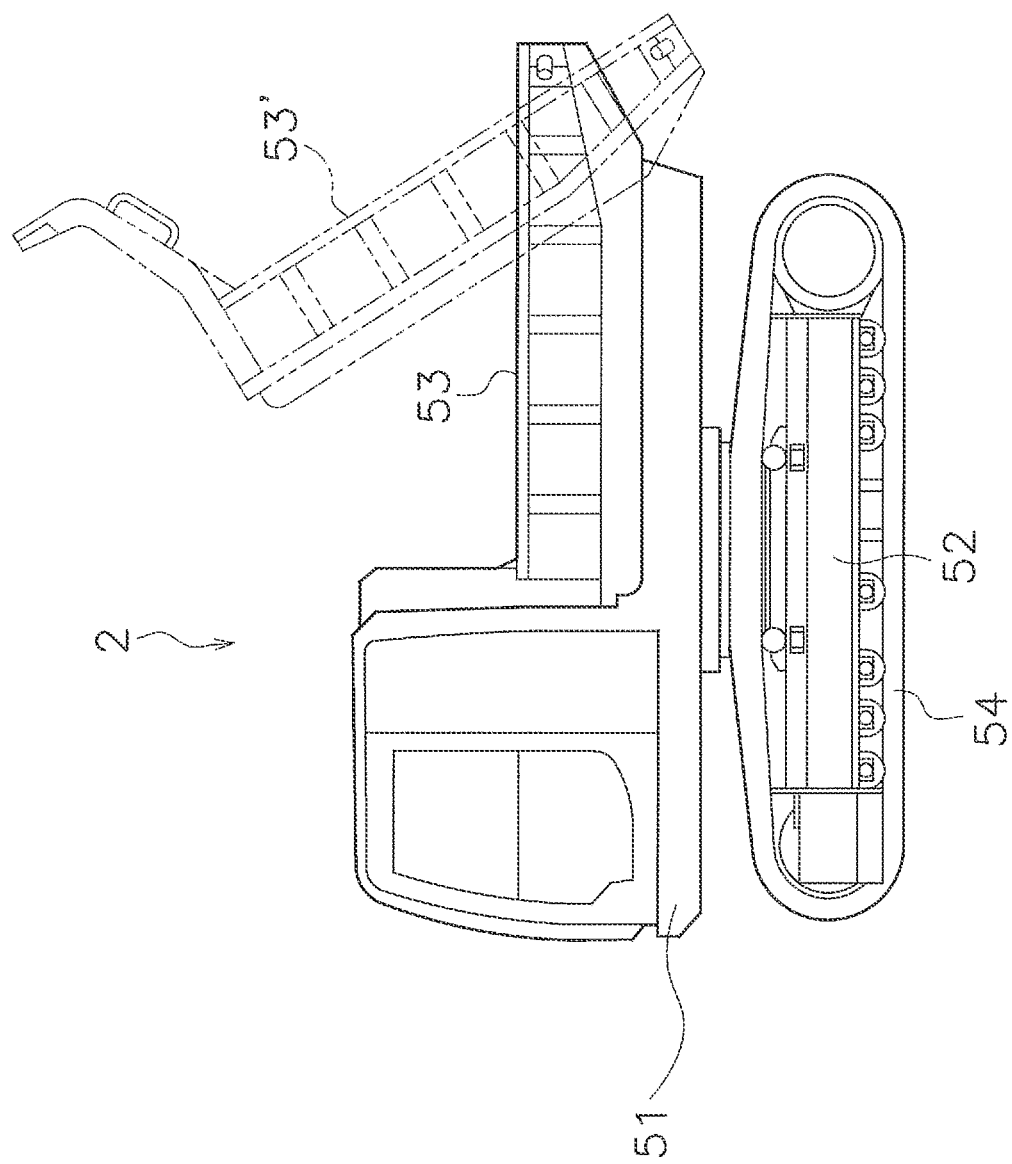
FIG. 4 is a side view of the conveyance vehicle.

FIG. 4 is a side view of the conveyance vehicle 2. As illustrated in FIG. 4, the conveyance vehicle 2 includes a vehicle body 51, a traveling body 52, and a bed 53. The vehicle body 51 is rotatably supported with respect to the traveling body 52. The traveling body 52 includes crawler belts 54. The crawler belts 54 are driven by driving force from an engine 55 described later, whereby the conveyance vehicle 2 travels. The bed 53 is supported by the vehicle body 51. Accordingly, the bed 53 is supported so as to be rotatable together with the vehicle body 51 with respect to the traveling body 52. The bed 53 is configured to move between a dumping posture and a conveying posture. In FIG. 4, the bed 53 indicated by solid lines indicates the position of the bed 53 in the conveying posture. A bed 53' indicated by chain double-dashed lines indicates the position of the bed 53 in the dumping posture. In the conveying posture, the bed 53 is disposed approximately horizontally. In the dumping posture, the bed 53 is inclined with respect to the conveying posture.

Figure 5:
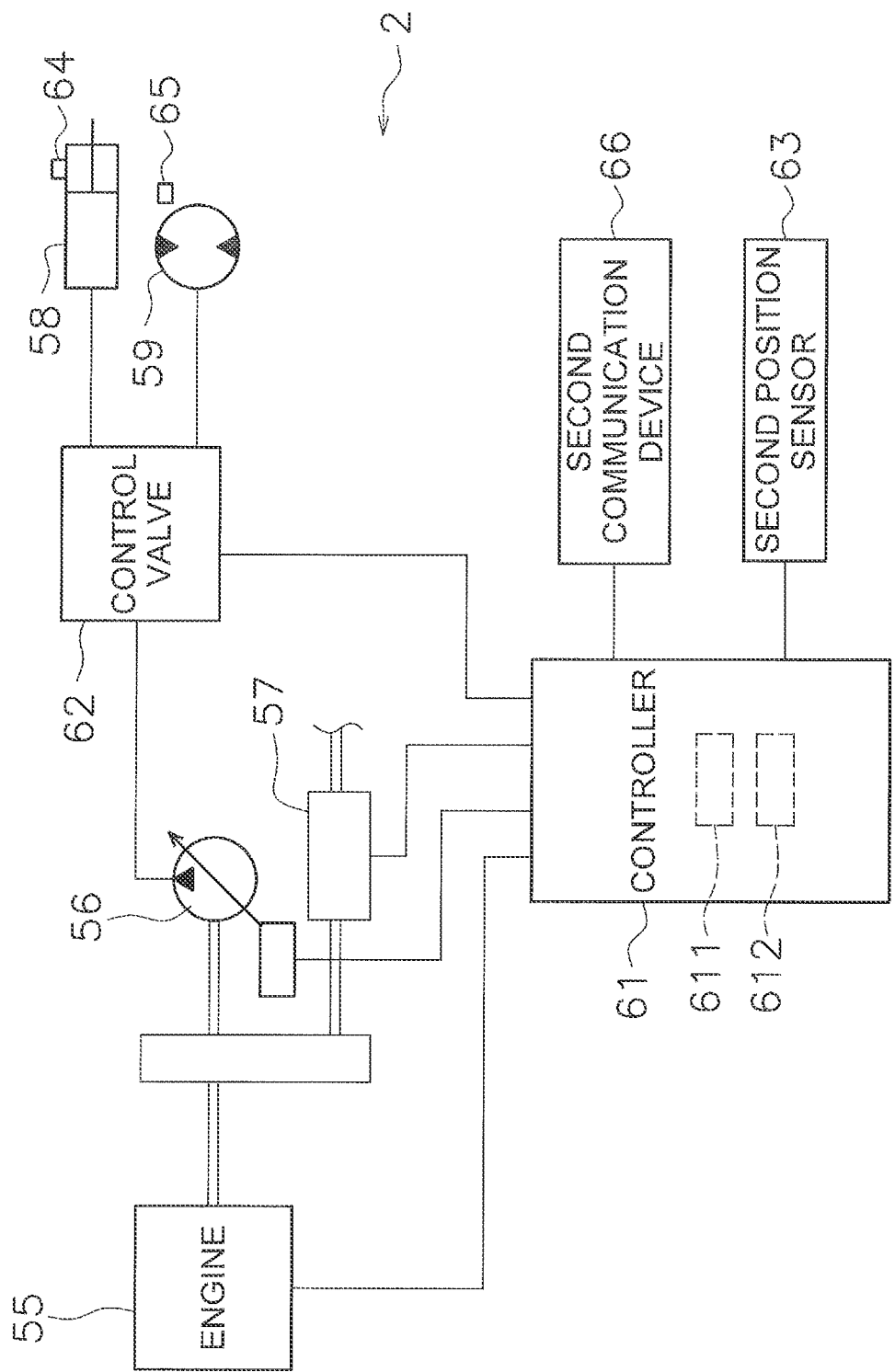
FIG. 5 is a block diagram illustrating a configuration of the conveyance vehicle.

FIG. 5 is a block diagram illustrating a configuration of a control system of the conveyance vehicle 2. The conveyance vehicle 2 includes an engine 55, a hydraulic pump 56, a power transmission device 57, a lift cylinder 58, a rotation motor 59, a controller 61, and a control valve 62. The controller 61 includes a second processor 611 such as a CPU or a GPU, and a memory 612. The second processor 611 performs a process for automatic control of the conveyance vehicle 2. The memory 612 stores data and programs for the automatic control of the conveyance vehicle 2. For example, the memory 612 includes a volatile memory and a non-volatile memory.

The engine 55, the hydraulic pump 56, the power transmission device 57, the controller 61, and the control valve 62 have the same configurations as the engine 24, the hydraulic pump 25, the power transmission device 26, the controller 27, and the control valve 31 of the work machine 1, respectively. Therefore, detailed explanations thereof are omitted.

The lift cylinder 58 is a hydraulic cylinder. The rotation motor 59 is a hydraulic motor. Hydraulic fluid discharged from the hydraulic pump 56 is supplied to the lift cylinder 58 and the rotation motor 59. The lift cylinder 58 and the rotation motor 59 are driven by the hydraulic fluid from the hydraulic pump 56. The lift cylinder 58 raises and lowers the bed 53. Consequently, the posture of the bed 53 is switched between the conveying posture and the dumping posture. The rotation motor 59 causes the vehicle body 51 to rotate with respect to the traveling body 52. The controller 61 controls the lift cylinder 58 by means of the control valve 62, thereby controlling the operation of the bed 53. In addition, the controller 61 controls the rotation motor 59 by means of the control valve 62, thereby controlling the rotation of the vehicle body 51.

The conveyance vehicle 2 includes a second position sensor 63, a bed sensor 64, and a rotation angle sensor 65. The second position sensor 63 includes a GNSS receiver and an IMU in the same way as the first position sensor 33 of the work machine 1. The second position sensor 63 outputs position data. The position data includes data indicative of a position of the conveyance vehicle 2 and data indicative of a posture of the vehicle body 51.

The bed sensor 64 detects the posture of the bed 53 and outputs bed data indicative of the posture of the bed 53. The bed sensor 64 is, for example, a stroke sensor that detects the stroke amount of the lift cylinder 58. The bed data includes the stroke amount of the lift cylinder 58. Alternatively, the bed sensor 64 may be another type of sensor such as a sensor that detects an inclination angle of the bed 53. The rotation angle sensor 65 detects the rotation angle of the vehicle body 51 with respect to the traveling body 52 and outputs rotation angle data indicative of the rotation angle.

The controller 61 is communicatably connected to the second position sensor 63, the bed sensor 64, and the rotation angle sensor 65 by wire or wirelessly. The controller 61 receives the position data, the bed data, and the rotation angle data from the second position sensor 63, the bed sensor 64, and the rotation angle sensor 65, respectively.

The conveyance vehicle 2 includes a second communication device 66. The controller 61 of the conveyance vehicle 2 performs data communication with the controller 27 of the work machine 1 via the second communication device 66. The controller 61 of the conveyance vehicle 2 transmits the position data of the conveyance vehicle 2, the bed data, and the rotation angle data via the second communication device 66. The controller 27 of the work machine 1 receives the position data of the conveyance vehicle 2, the bed data, and the rotation angle data via the first communication device 38. The controller 27 of the work machine 1 stores vehicle dimension data indicative of the dispositions and the dimensions of the vehicle body 51 of the conveyance vehicle 2 and the bed 53. The controller 27 calculates a position of the bed 53 from the position data of the conveyance vehicle 2, the bed data, the rotation angle data, and the vehicle dimension data.

Figure 6:
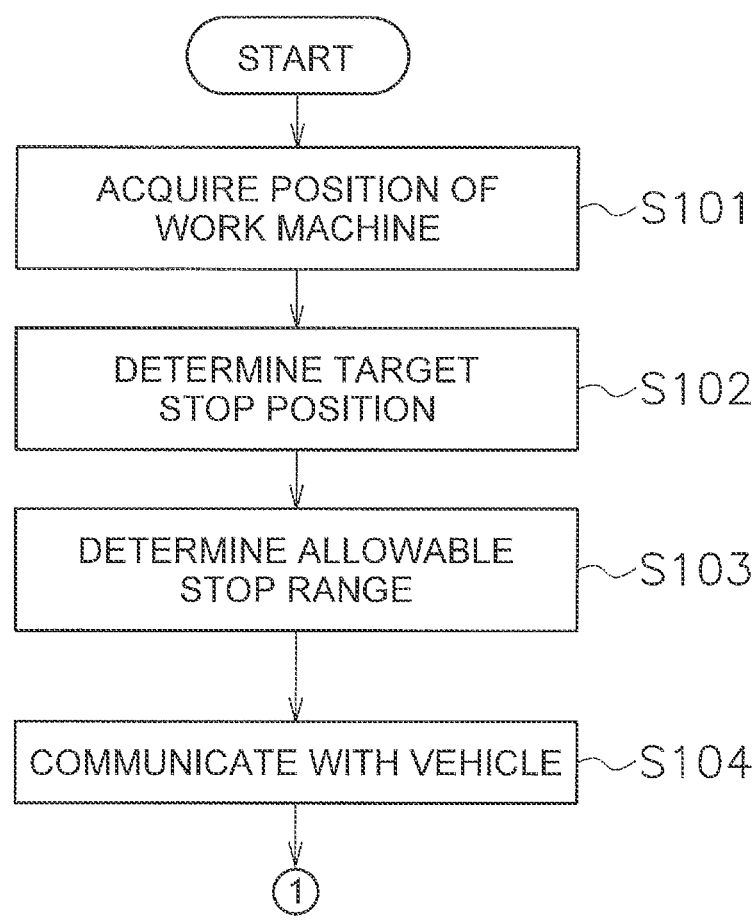
FIG. 6 is a flowchart illustrating a process of automatic control of the work machine.
Figure 7:
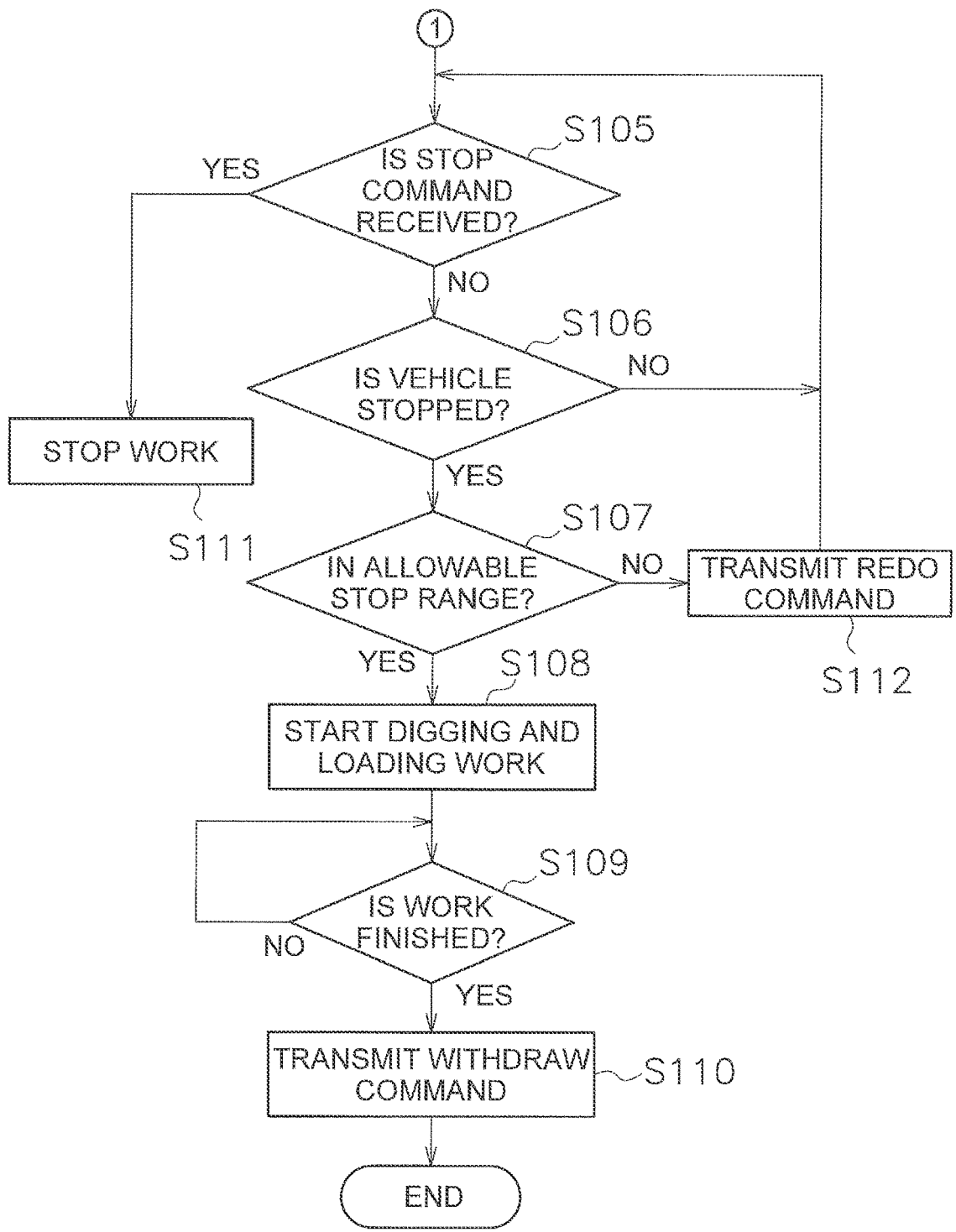
FIG. 7 is a flowchart illustrating a process of automatic control of the work machine.
Figure 8:
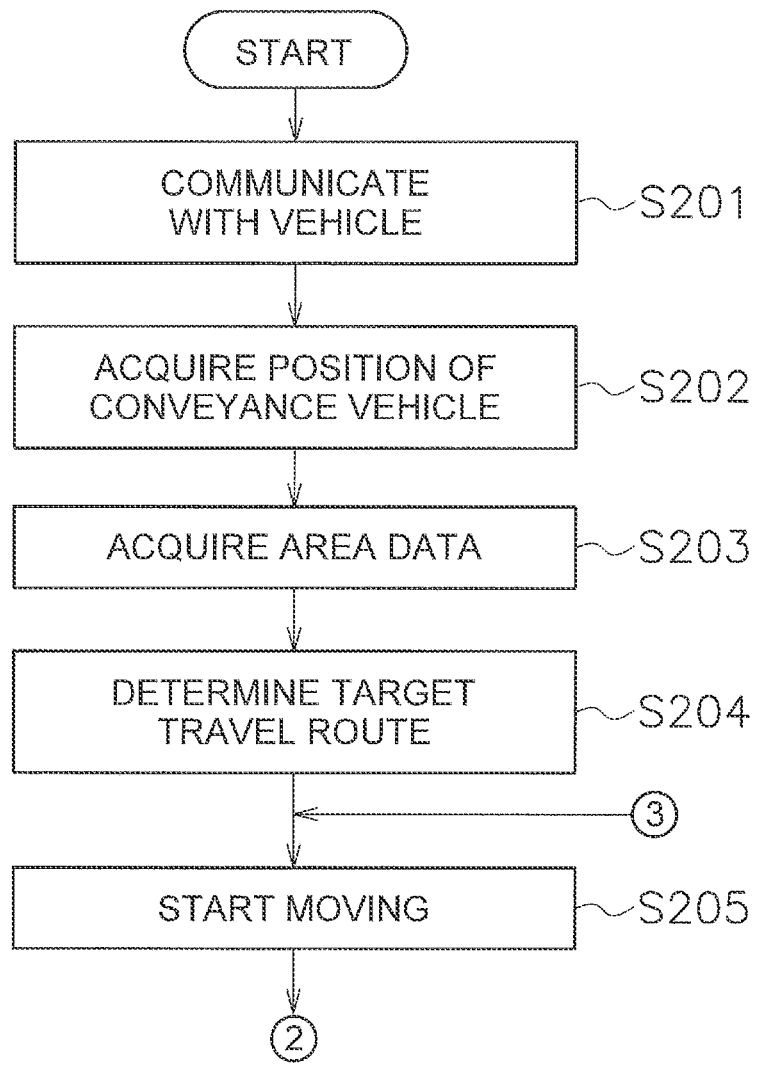
FIG. 8 is a flowchart illustrating a process of automatic control of the conveyance vehicle.
Figure 9:
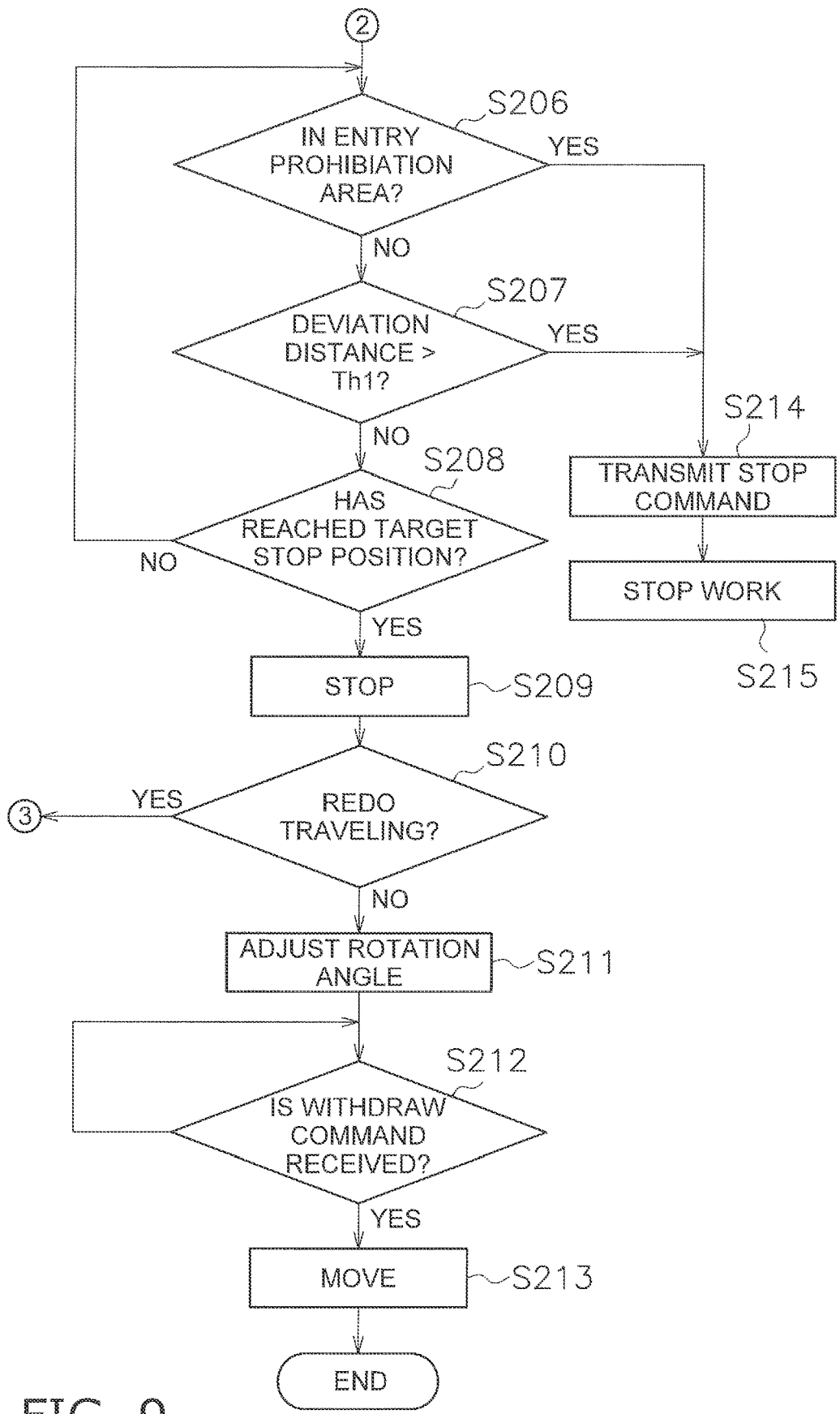
FIG. 9 is a flowchart illustrating a process of automatic control of the conveyance vehicle.

Next, a process of an automatic control mode executed by the controller 27 of the work machine 1 and the controller 61 of the conveyance vehicle 2 will be described. In the automatic control mode, the controller 61 of the conveyance vehicle 2 controls the conveyance vehicle 2 so that the conveyance vehicle 2 automatically travels back and forth between the loading position L2 and the predetermined dumping position L3. The controller 27 of the work machine 1 controls the work machine 1 so that the work machine 1 automatically performs the digging and loading work described above. FIGS. 6 and 7 are flowcharts illustrating the process of the automatic control mode executed by the controller 27 of the work machine 1. FIGS. 8 and 9 are flowcharts illustrating the process of the automatic control mode executed by the controller 61 of the conveyance vehicle 2.

Figure 10:
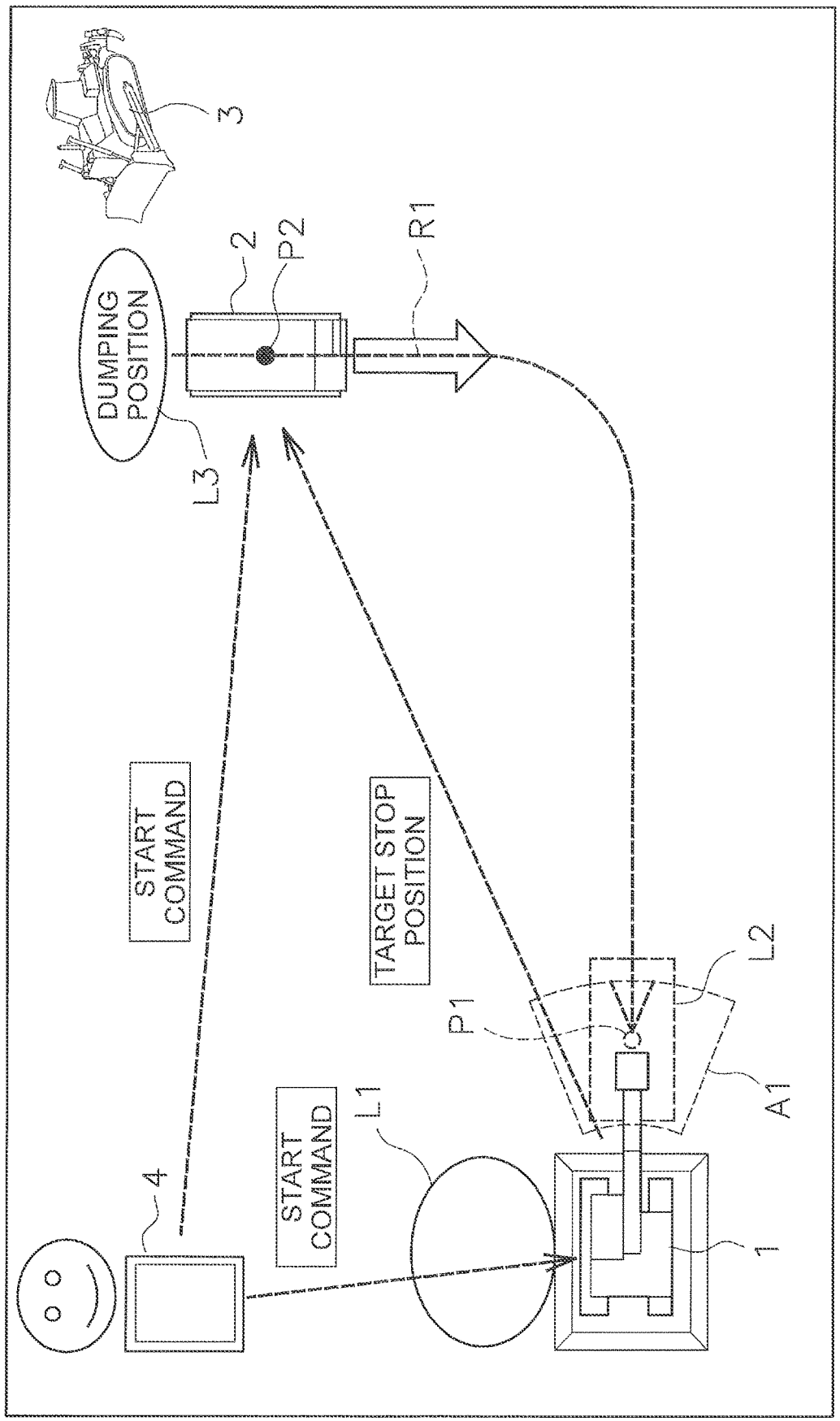
FIG. 10 is a plan view schematically illustrating conditions of the work site in an automatic control mode.

Upon receiving a start command for starting the automatic control mode, the controller 27 of the work machine 1 executes the process of the automatic control mode illustrated in FIG. 6. As illustrated in FIG. 10, the start command for starting the automatic control mode is output from the abovementioned remote computer device 4 due to, for example, the operator operating the input device 402 of the remote computer device 4. The controller 27 receives the start command via the first communication device 38. The controller 61 of the conveyance vehicle 2 also receives the start command for starting the automatic control mode. Upon receiving the start command for starting the automatic control mode, the controller 61 of the conveyance vehicle 2 executes the process of the automatic control mode illustrated in FIG. 8.

In step S101, the controller 27 of the work machine 1 acquires the position of the work machine 1 as illustrated in FIG. 6. Here, the controller 27 acquires the position data of the work machine 1, the posture data of the work implement 12, and the rotation angle data from the first position sensor 33, the work implement sensors 34a to 34c, and the rotation angle sensor 39, respectively. The controller 27 calculates the blade tip position of the bucket 19 from the position data, the work implement data, and the rotation angle data. The controller 27 continuously acquires and updates the position of the work machine 1 during the automatic control mode.

In step S102, the controller 27 determines a target stop position P1 in the loading position L2 of the conveyance vehicle 2 based on the position of the work machine 1. Specifically, the controller 27 acquires data indicative of the direction of the loading position L2 with respect to the work machine 1. The controller 27 acquires the direction of the loading position L2 with respect to the work machine 1 by calculation from the position of the work machine 1 and the loading position L2. Further, the controller 27 acquires data indicative of a target offset distance of the conveyance vehicle 2 with respect to the work machine 1. For example, the target offset distance is stored in the memory 272, and the controller 27 reads the target offset distance from the memory 272. The controller 27 determines the target stop position P1 of the conveyance vehicle 2 based on the direction of the loading position L2, the target offset distance, and the position of the work machine 1. For example, the controller 27 determines, as the target stop position P1 of the conveyance vehicle 2, a position that is away from the position of the work machine 1 toward the direction of the loading position L2 by the target offset distance.

In step S103, the controller 27 determines an allowable stop range A1 of the conveyance vehicle 2. As illustrated in FIG. 10, the allowable stop range A1 is a range positioned in the direction of the loading position L2 with respect to the work machine 1, and includes the target stop position P1. The controller 27 determines the allowable stop range A1 from the position of the work machine 1. The allowable stop range A1 will be described later.

In step S104, the controller 27 communicates with the conveyance vehicle 2. Here, the controller 27 transmits the target stop position P1 to the conveyance vehicle 2. In step S201, the controller 61 of the conveyance vehicle 2 communicates with the work machine 1 as illustrated in FIG. 8. Here, the controller 61 of the conveyance vehicle 2 receives the target stop position P1 transmitted by the controller 27 of the work machine 1 via the second communication device 66.

In step S202, the controller 61 acquires the position of the conveyance vehicle 2. Here, the controller 27 acquires the position data of the conveyance vehicle 2, the bed data, and the rotation angle data from the second position sensor 63, the bed sensor 64, and the rotation angle sensor 65, respectively. The controller 61 continuously acquires and updates the position of the conveyance vehicle 2 during the automatic control mode.

Figure 11:
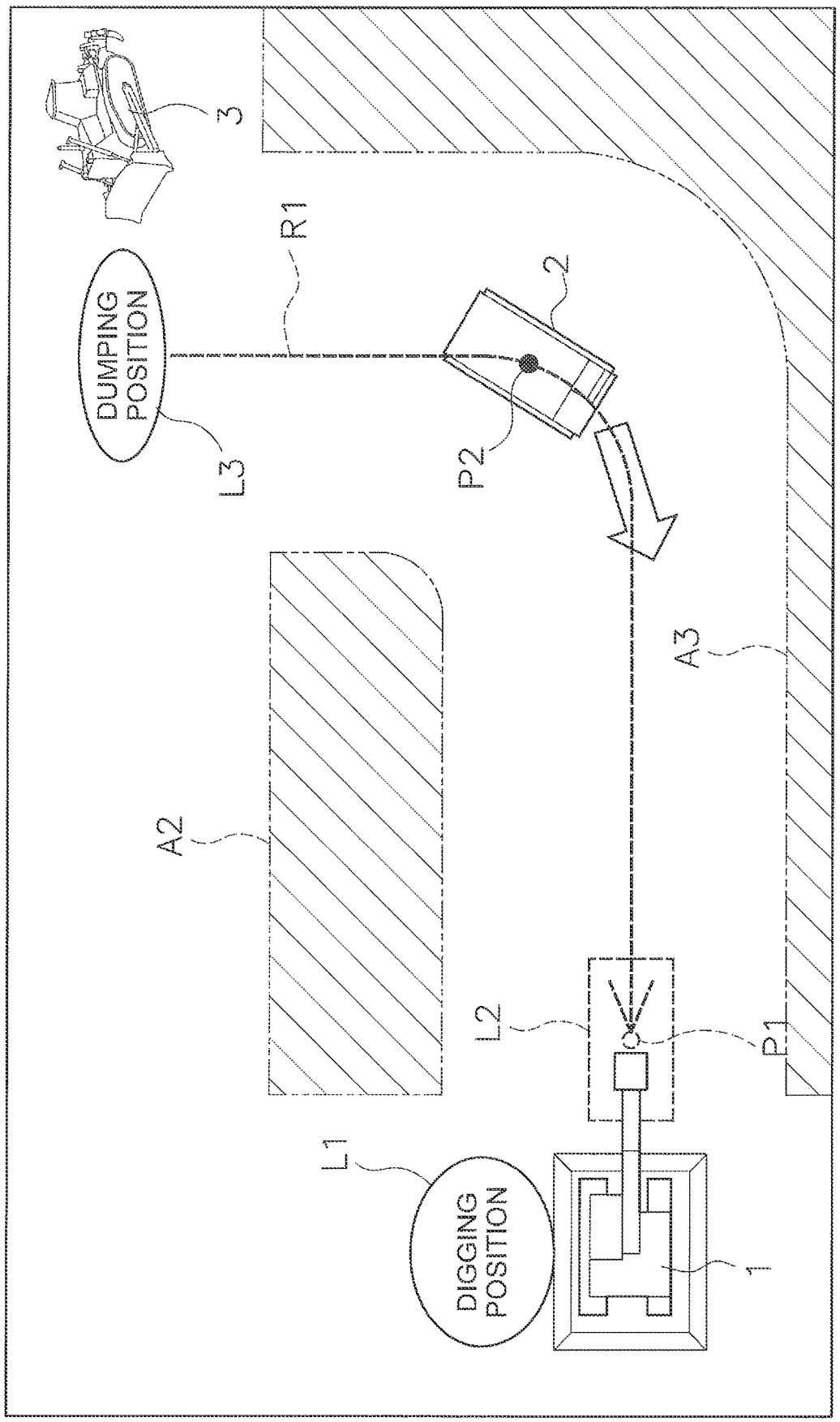
FIG. 11 is a plan view schematically illustrating conditions of the work site in the automatic control mode.

In step S203, the controller 61 acquires area data. The area data includes data indicative of the topography of the work site. The area data also includes data indicative of entry prohibition areas A2 and A3 of the conveyance vehicle 2 illustrated in FIG. 11.

In step S204, the controller 61 determines a target travel route R1. The target travel route R1 is a route from a current position of the conveyance vehicle 2 to the target stop position P1. The controller 61 determines the target travel route R1 from the abovementioned area data, the position data of the conveyance vehicle 2, and the target stop position P1. The controller 61 determines the target travel route R1 so as to avoid the entry prohibition areas A2 and A3. For example, the controller 61 determines the target travel route R1 so as to avoid the entry prohibition areas A2 and A3 and to minimize the moving distance of the conveyance vehicle 2. The controller 61 may determine the target travel route R1 in consideration of a factor other than the entry prohibition areas A2 and A3.

In step S205, the controller 61 causes the conveyance vehicle 2 to start moving. The controller 61 controls the conveyance vehicle 2 so that the conveyance vehicle 2 moves along the target travel route R1 to the target stop position P1.

In step S206 illustrated in FIG. 9, the controller 61 determines whether the conveyance vehicle 2 is positioned in the entry prohibition area A2 or A3. The controller 61 determines whether the conveyance vehicle 2 is positioned in the entry prohibition area A2 or A3 from the abovementioned current position of the conveyance vehicle 2 indicated by the position data of the conveyance vehicle 2 and the entry prohibition areas A2 and A3 indicated by the area data.

When the conveyance vehicle 2 is positioned in the entry prohibition area A2 or A3, the controller 61 transmits a stop command for stopping the automatic control to the work machine 1 in step S214. In step S215, the controller 61 stops the work of the conveyance vehicle 2. For example, the controller 61 causes the conveyance vehicle 2 to stop. Alternatively, the controller 61 may cause the conveyance vehicle 2 to return to the dumping position L3.

As illustrated in FIG. 7, upon receiving the stop command for stopping the automatic control from the conveyance vehicle 2 in step S105, the controller 27 of the work machine 1 stops the work of the work machine 1 in step S111. For example, the controller 61 causes the work machine 1 to stop.

Figure 12:
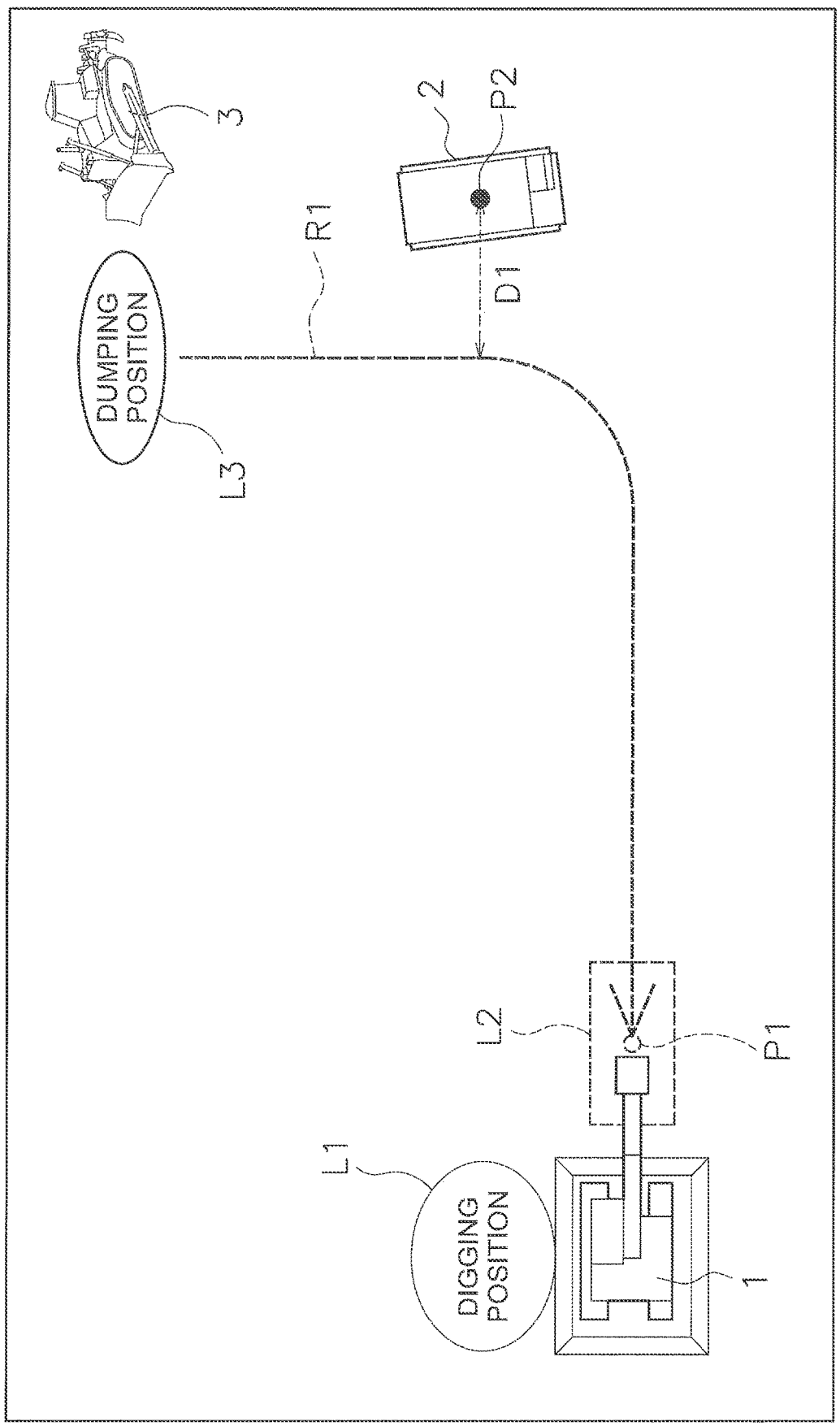
FIG. 12 is a plan view schematically illustrating conditions of the work site in the automatic control mode.

As illustrated in FIG. 9, in step S207, the controller 61 determines whether a deviation distance D1 is greater than a predetermined threshold Th1. As illustrated in FIG. 12, the deviation distance D1 is a distance that the conveyance vehicle 2 is deviated from the target travel route R1. The controller 61 calculates the deviation distance D1 from the abovementioned current position of the conveyance vehicle 2 indicated by the position data of the conveyance vehicle 2 and the target travel route R1. The predetermined threshold Th1 is stored in the memory 612, for example. When the deviation distance D1 is greater than the predetermined threshold Th1, similarly to the mentioned above, the controller 61 transmits the stop command for stopping the automatic control to the work machine 1 in step S214. In step S215, the controller 61 stops the work.

Figure 13:
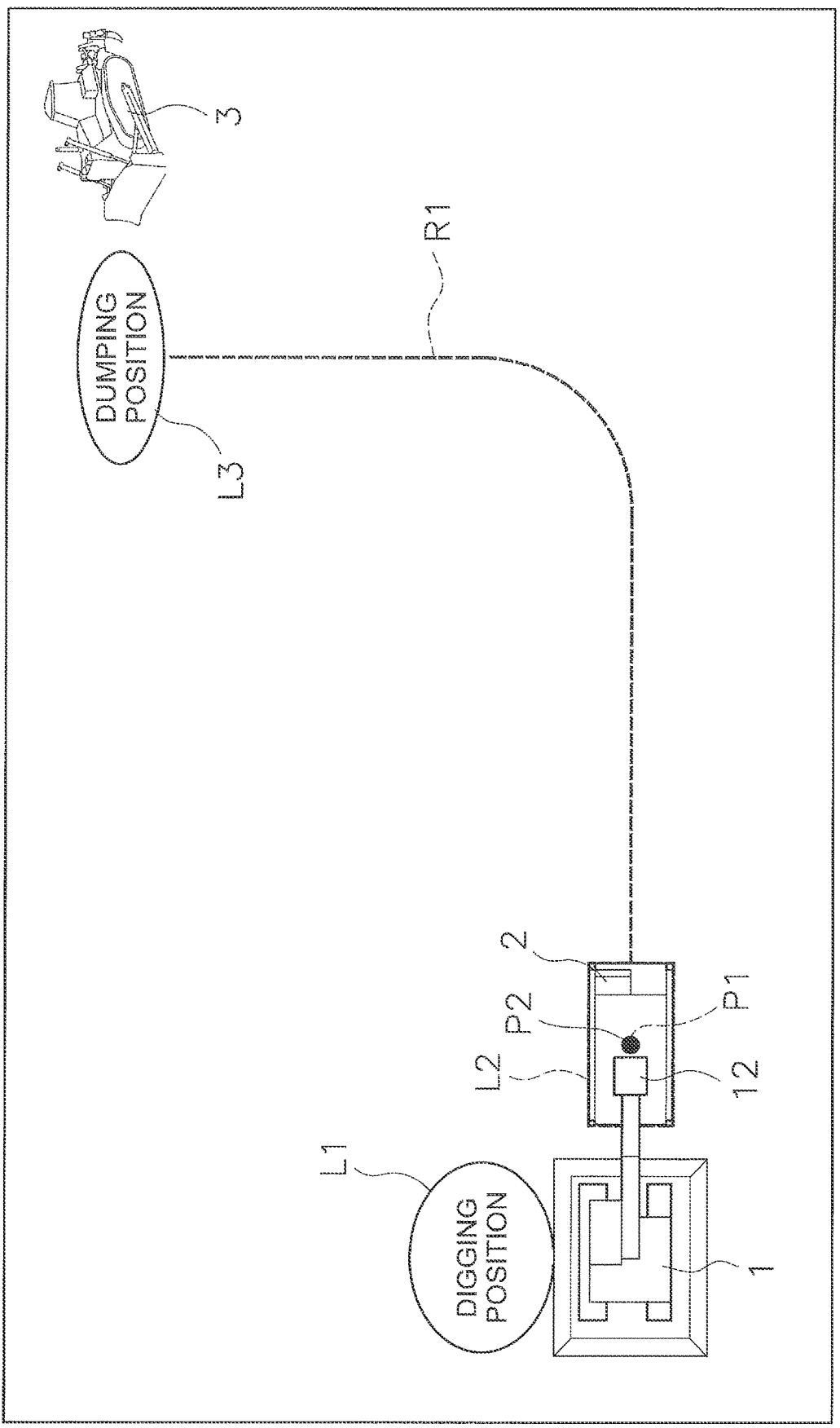
FIG. 13 is a plan view schematically illustrating conditions of the work site in the automatic control mode.

In step S208, the controller 61 determines whether the conveyance vehicle 2 has reached the target stop position P1. The controller 61 determines whether the conveyance vehicle 2 has reached the target stop position P1 from the abovementioned current position of the conveyance vehicle 2 indicated by the position data of the conveyance vehicle 2 and the target stop position P1. For example, the controller 27 determines that the conveyance vehicle 2 has reached the target stop position P1 when the position of a reference point P2 included in the conveyance vehicle 2 matches or substantially matches the target stop position P1. For example, the reference point P2 of the conveyance vehicle 2 is a rotation center of the bed 53. However, the reference point P2 of the conveyance vehicle 2 may be another position of the conveyance vehicle 2. For example, the reference point P2 of the conveyance vehicle 2 may be a center point in the longitudinal direction and the width direction of the conveyance vehicle 2. As illustrated in FIG. 13, when the conveyance vehicle 2 has reached the target stop position P1, the controller 61 causes the conveyance vehicle 2 to stop in step S209.

As illustrated in FIG. 7, in step S106, the controller 27 of the work machine 1 determines whether the conveyance vehicle 2 has stopped. For example, the controller 27 determines whether the conveyance vehicle 2 has stopped from the position data of the conveyance vehicle 2 received from the conveyance vehicle 2. Alternatively, the controller may determine whether the conveyance vehicle 2 has stopped with image recognition technology based on the first image data output from the first camera 36 and/or the second image data output from the second cameras 37. When the conveyance vehicle 2 has stopped, the process proceeds to step S107.

Figure 14:
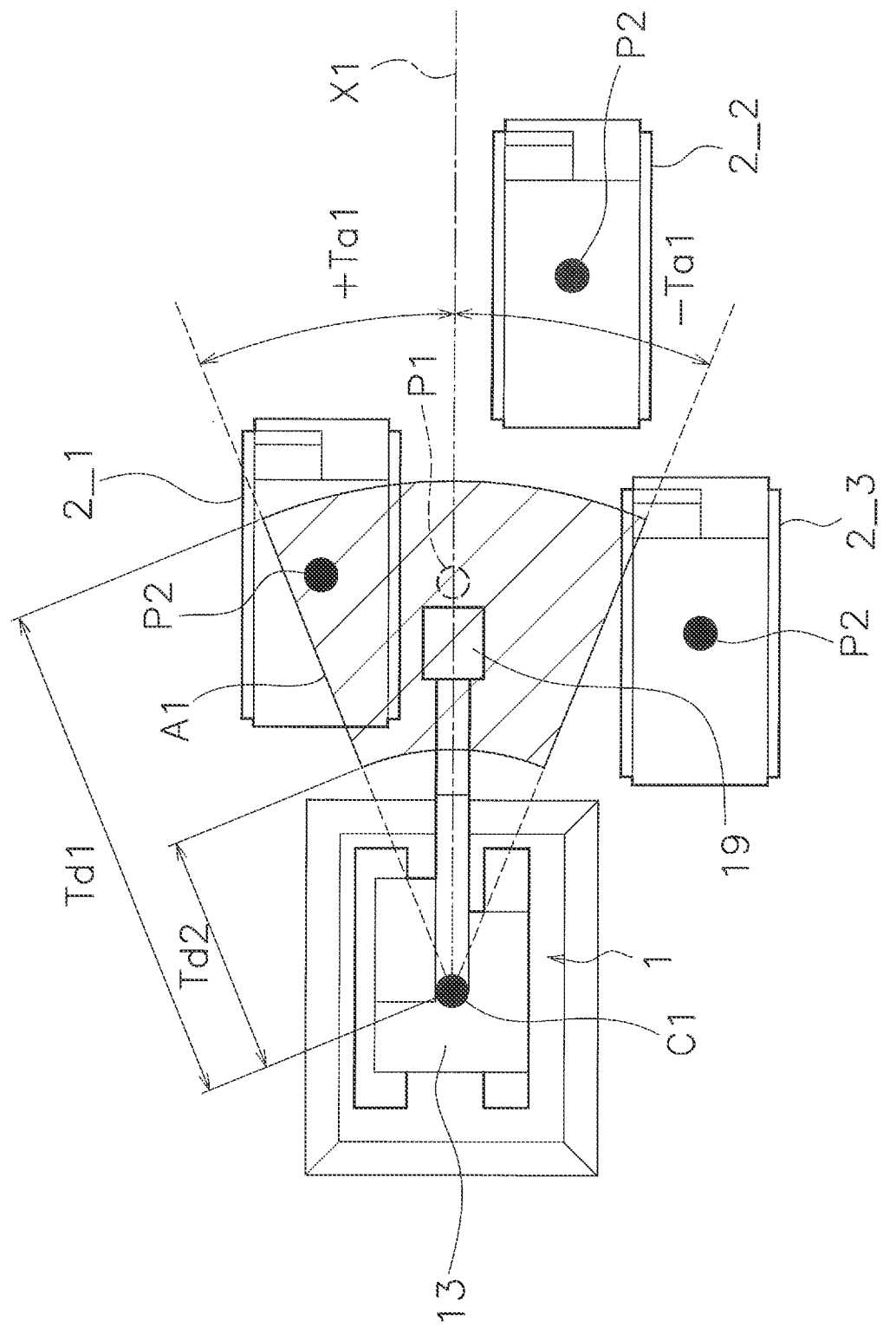
FIG. 14 is a plan view illustrating an example of an allowable stop range.

In step S107, the controller 27 determines whether the conveyance vehicle 2 is positioned in the allowable stop range A1. As described above, the allowable stop range A1 is the range that includes the target stop position P1, and the controller 27 determines the allowable stop range A1 from the position of the work machine 1. FIG. 14 is a view illustrating an example of the allowable stop range A1. The controller 27 determines the allowable stop range A1 based on the digging position L1 and the distance from the work machine 1.

Specifically, as illustrated in FIG. 14, the allowable stop range A1 is the range in which a distance from a rotation center C1 of the rotating body 13 is equal to or less than a first distance threshold Td1. The allowable stop range A1 is the range in which a distance from the rotation center C1 of the rotating body 13 is equal to or greater than a second distance threshold Td2. For example, the first distance threshold Td1 is the maximum value of the distance that the blade tip of the bucket 19 can reach. The second distance threshold Td2 is the minimum value of the distance that the blade tip of the bucket 19 can reach.

The allowable stop range A1 is the range in which an absolute value of the angle formed by a direction X1 of the loading position L2 with respect to the work machine 1 and a vector connecting any position in the allowable stop range A1 and the rotation center C1 is equal to or less than an angle threshold Ta1. The support body 14 of the work machine 1 is disposed facing the direction X1. For example, the angle threshold Ta1 is a value within a range in which the topography sensor 35 can appropriately measure the topography of the digging position L1 during the loading. In FIG. 14, the direction X1 of the loading position L2 with respect to the work machine 1 is zero degrees and the counterclockwise direction is a positive value.

When the reference point P2 of the conveyance vehicle 2 is positioned in the allowable stop range A1, the controller 27 determines that the conveyance vehicle 2 is positioned in the allowable stop range A1. For example, the controller 27 determines that a position 2_1 of the conveyance vehicle 2 indicated in FIG. 14 is positioned in the allowable stop range A1. The controller 27 determines that a position 2_2 and a position 2_3 of the conveyance vehicle 2 indicated in FIG. 14 are not positioned in the allowable stop range A1.

In step S107, when the conveyance vehicle 2 is not positioned in the allowable stop range A1, the process proceeds to step S112. In step S112, the controller 27 transmits a redo command to the conveyance vehicle 2. As illustrated in FIG. 9, when the controller 61 of the conveyance vehicle 2 receives the redo command in step S210, the process returns to step S205, and the conveyance vehicle 2 again moves to the target stop position P1.

Figure 15:
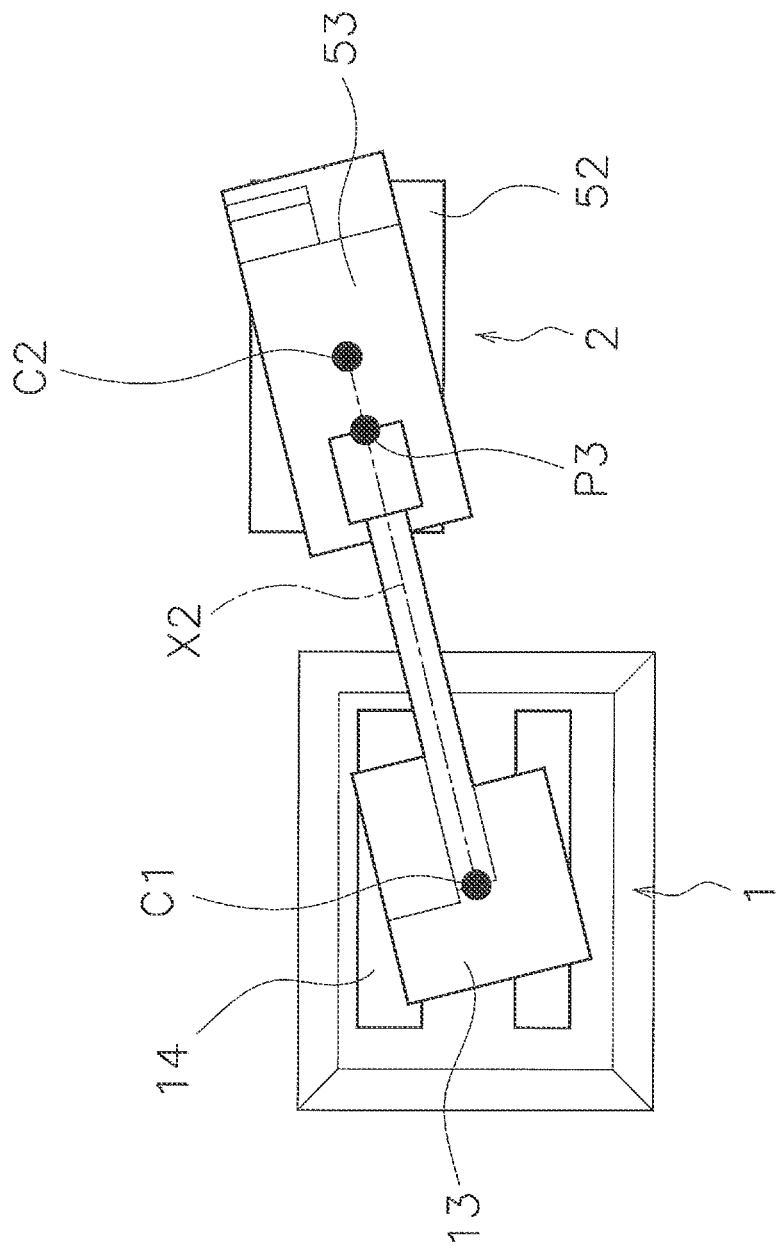
FIG. 15 is a plan view illustrating adjustment to a rotation angle of a bed of the conveyance vehicle.

When the conveyance vehicle 2 is positioned in the allowable stop range A1 in step S107, in step S211, the controller 61 of the conveyance vehicle 2 adjusts the rotation angle of the bed 53 while keeping the conveyance vehicle 2 stopped. The controller 61 determines the rotation angle of the bed 53 with respect to the traveling body 52 based on the position of the work machine 1 and the position of the conveyance vehicle 2. Specifically, as illustrated in FIG. 15, the controller 61 determines the rotation angle of the bed 53 with respect to the traveling body 52 so that the bed 53 faces a straight line X2 connecting a rotation center C2 of the bed 53 and the rotation center C1 of the work machine 1, and causes the bed 53 to rotate. In other words, the controller 61 determines the rotation angle of the bed 53 with respect to the traveling body 52 so that the longitudinal direction of the bed 53 matches the direction of the straight line X2 connecting the rotation center C2 of the bed 53 and the rotation center C1 of the work machine 1, and causes the bed 53 to rotate. As a result, the rear end of the bed 53 is disposed facing the work machine 1 in the direction from the rotation center C2 of the bed 53 toward the rotation center C1 of the work machine 1.

Figure 16:
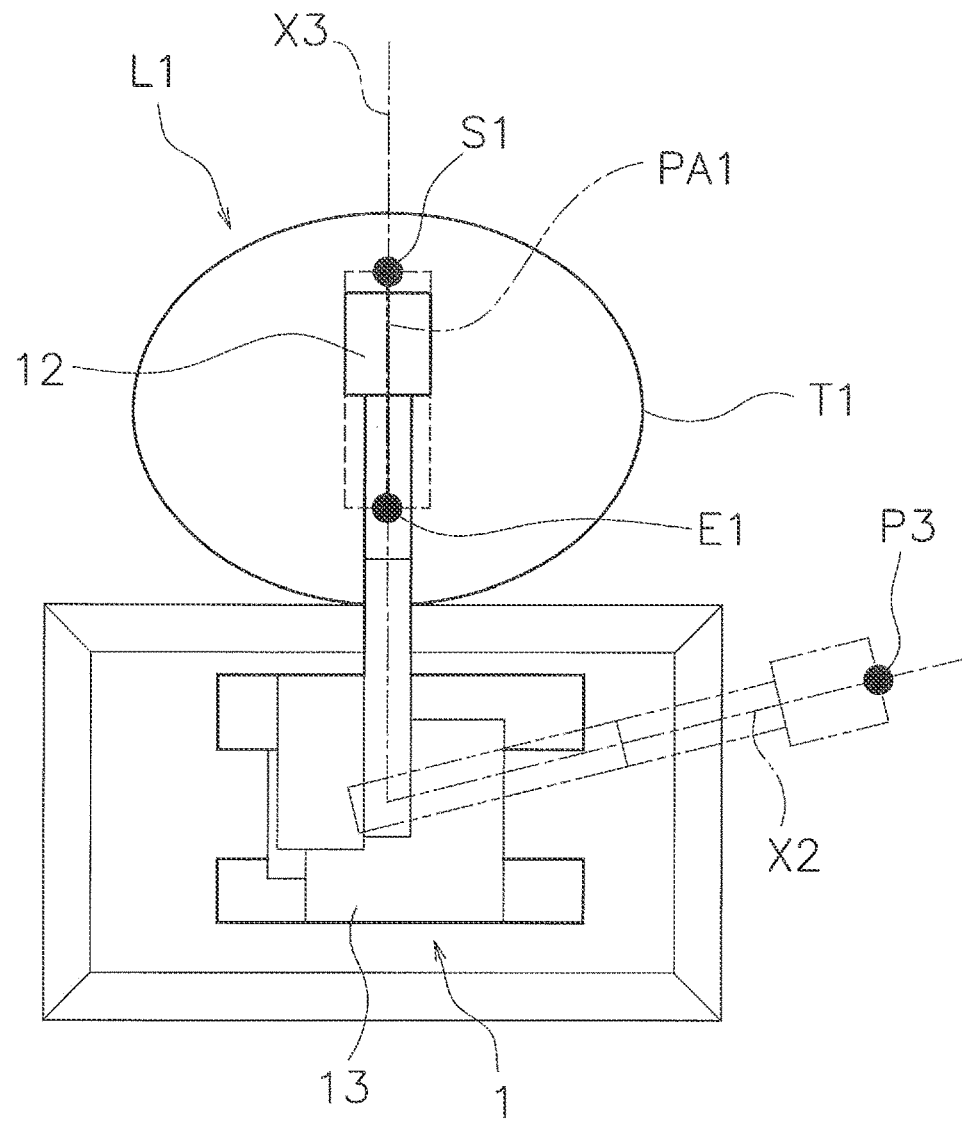
FIG. 16 is a plan view illustrating an example of a current topography and a digging path.
Figure 17:
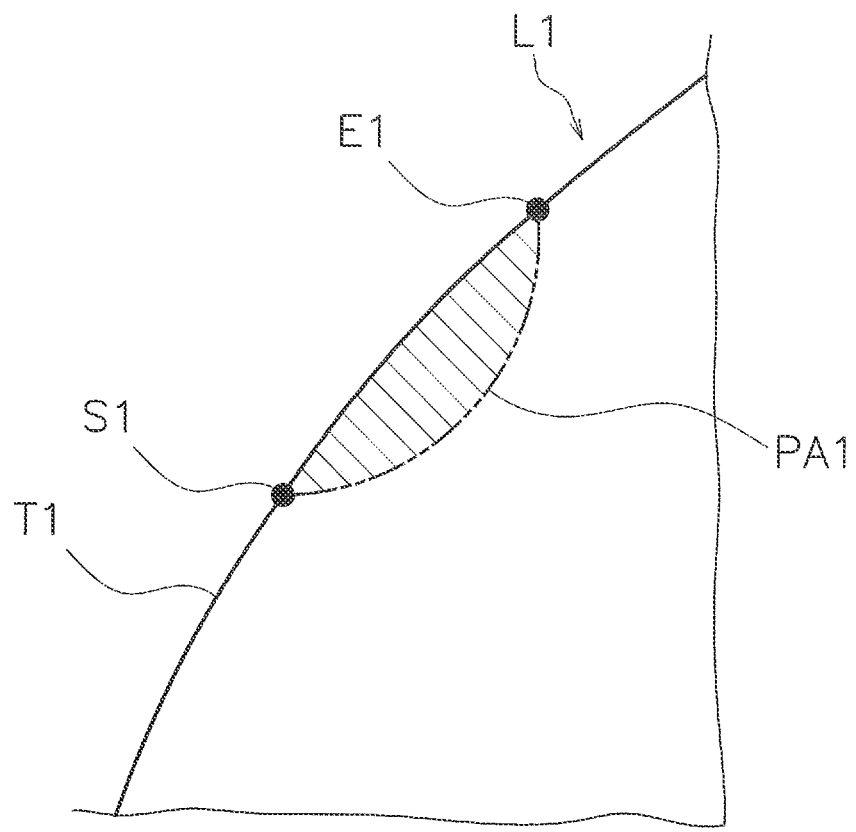
FIG. 17 is a side view illustrating an example of a cross section of the current topography and the digging path.

Upon finishing the adjustment of the rotation angle of the bed 53 of the conveyance vehicle 2, the controller 27 of the work machine 1 starts digging materials and loading the materials onto the conveyance vehicle 2 in step S108. Here, the controller 27 acquires topography data indicative of a current topography T1 of the digging position L1 measured by the topography sensor 35. The controller 27 determines a digging path PA1 from the current position of the work machine 1 and the topography data. The digging path PA1 is a target trajectory of the blade tip position of the bucket 19. FIG. 16 is a plan view illustrating an example of the current topography T1 and the digging path PA1. FIG. 17 is a side view illustrating an example of a cross section of the current topography T1 and the digging path PA1. The controller 27 determines the digging path PA1 so that the amount of the materials to be dug by the work implement 12 such as the volume or the weight matches a target value.

As illustrated in FIG. 17, the controller 27 determines the digging path PA1 so that the volume between the surface of the current topography T1 and the digging path PA1 (the hatched portion in FIG. 17) matches the target value. The target value is determined based on the capacity of the bucket 19, for example. The digging path PA1 includes a digging start point S1 and a digging end point E1. The digging start point S1 and the digging end point E1 are intersections of the surface of the topography T1 and the digging path PA1.

The controller 27 determines a target rotation angle at the time of down rotating. The controller 27 determines the target rotation angle at the time of the down rotating from a current blade tip position of the bucket 19 and a straight line X3 connecting the rotation center C1 of the work machine 1 and the digging start point S1. In the down rotating, the controller 27 causes the blade tip position of the bucket 19 to be lowered toward the height of the digging start point S1, while causing the rotating body 13 to be rotated toward the digging start point S1. Then, the controller 27 controls the work implement 12 so that the blade tip position of the bucket 19 moves along the digging path PA1. Accordingly, the materials are dug by the work implement 12.

Further, the controller 27 determines a target rotation angle at the time of hoist rotating. The controller 27 determines the target rotation angle at the time of the hoist rotating from a current blade tip position of the bucket 19 after digging and the straight line X2 connecting the rotation center C1 of the work machine 1 and the rotation center C2 of the bed 53. In the hoist rotating, the controller 27 causes the blade tip position of the bucket 19 to be raised toward an unloading position P3, while causing the rotating body 13 to be rotated toward the unloading position P3. The unloading position P3 is a position that is on the straight line X2 connecting the rotation center C1 of the work machine 1 and the rotation center C2 of the bed 53 and is above the bed 53. The controller 27 operates the work implement 12 so that the materials held by the bucket 19 are unloaded on the bed 53. As a result, the materials are loaded onto the bed 53.

In step S109 illustrated in FIG. 7, the controller 27 determines whether the loading is finished. The controller 27 determines that the loading is finished when the amount of the materials loaded onto the bed 53 (hereinafter, referred to as "loading amount") reaches an allowable amount. The loading amount may be a volume or a weight. The controller 27 calculates the loading amount from the load data. Specifically, the controller 27 calculates the amount of the dug materials from the load data. The controller 27 calculates the total value of the amount of the materials loaded onto the bed 53 as the loading amount.

Figure 18:
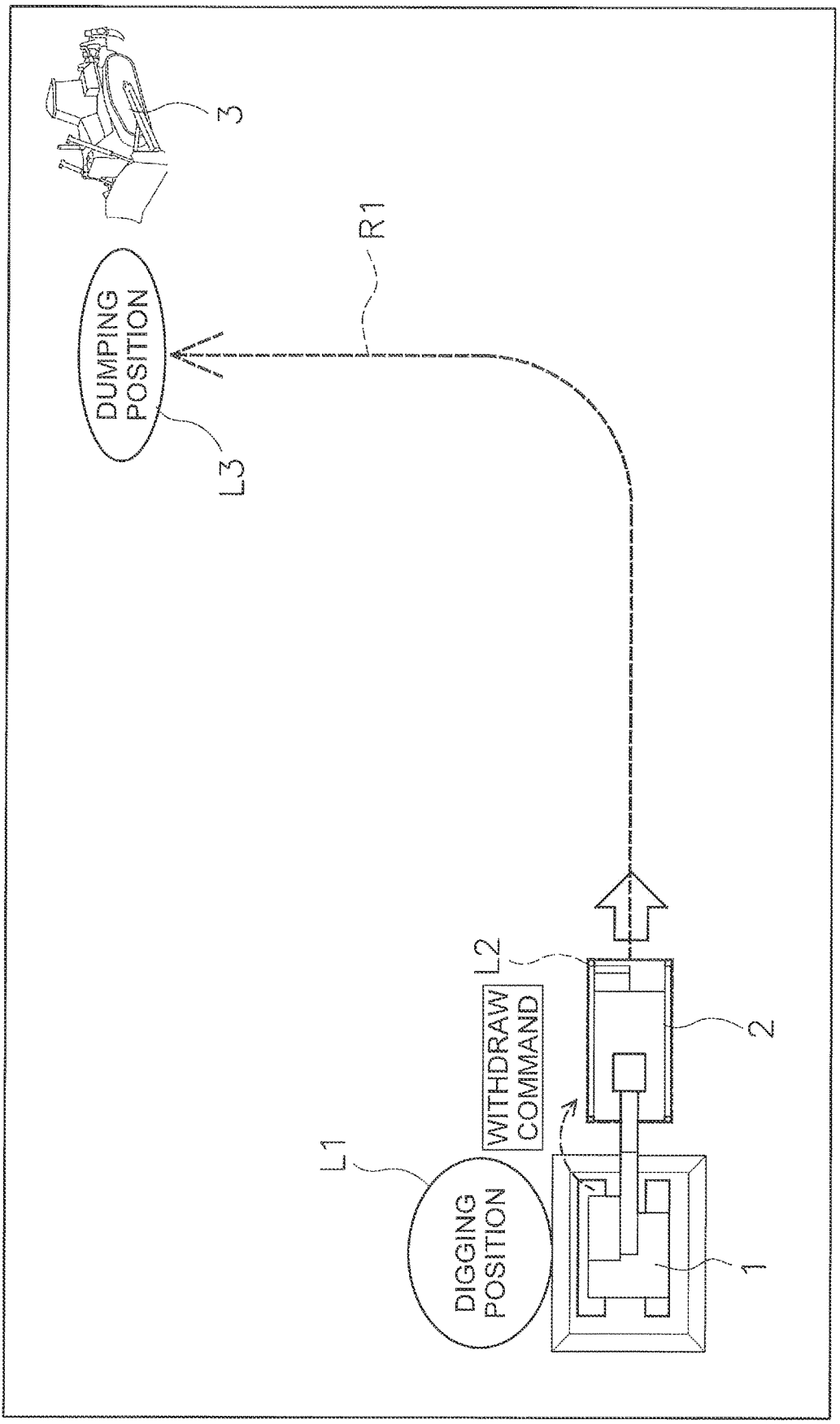
FIG. 18 is a plan view schematically illustrating conditions of the work site in the automatic control mode.

When the controller 27 determines that the loading is not finished in step S109, the digging of the materials and the loading thereof onto the conveyance vehicle 2 are performed again. The digging of the materials and the loading thereof onto the conveyance vehicle 2 are repeated until it is determined that the loading is finished. When the controller 27 determines that the loading is finished in step S109, the process proceeds to step S110. In step S110, the controller 27 transmits a withdraw command for withdrawing from the loading position L2 to the conveyance vehicle 2 as illustrated in FIG. 18.

As illustrated in FIG. 9, in step S212, the controller 61 of the conveyance vehicle 2 determines whether a withdraw command is received. When the controller 61 receives the withdraw command, the process proceeds to step S213. In step S213, the controller 61 controls the conveyance vehicle 2 to start moving from the loading position L2 toward the dumping position L3.

With the control system according to the present embodiment described above, the target stop position P1 of the conveyance vehicle 2 is determined based on the position of the work machine 1. Then, the conveyance vehicle 2 is controlled to move to the target stop position P1. As a result, it is possible to perform the loading work onto the conveyance vehicle 2 by the work machine 1 with the automatic control and to appropriately coordinate the work machine 1 and the conveyance vehicle 2.

When the stop position of the conveyance vehicle 2 is in the allowable stop range A1, the controller 27 of the work machine 1 starts loading the materials onto the conveyance vehicle 2. Therefore, even if the position of the conveyance vehicle 2 is slightly deviated from the target stop position P1, it is possible to start loading the materials. When the position of the conveyance vehicle 2 is greatly deviated from the target stop position P1, the loading is not performed. Accordingly, the loading work onto the conveyance vehicle 2 by the work machine 1 can be performed efficiently.

When the conveyance vehicle 2 is positioned in the entry prohibition area A2 or A3, the controller 61 of the conveyance vehicle 2 transmits, to the work machine 1, the stop command for stopping the automatic control by the work machine 1. When the deviation distance D1 of the conveyance vehicle 2 from the target travel route R1 is greater than the predetermined threshold ml, the controller 61 transmits, to the work machine 1, the stop command for stopping the automatic control by the work machine 1. Accordingly, it is possible to quickly stop the automatic control when the movement of the conveyance vehicle 2 is not performed appropriately.

The controller 61 of the conveyance vehicle 2 controls the rotation angle of the bed 53 with respect to the traveling body 52 based on the position of the work machine 1 and the position of the conveyance vehicle 2. As a result, the loading work of the materials onto the conveyance vehicle 2 by the work machine 1 can be easily performed.

Although an embodiment of the present invention has been described so far, the present invention is not limited to the above embodiment and various modifications may be made within the scope of the invention.

The work machine 1 is not limited to a hydraulic excavator and may be another machine such as a wheel loader, a motor grader, or the like. The configuration of the work machine 1 is not limited to that of the above embodiment and may be changed. The work machine 1 may be a vehicle driven by an electric motor. For example, the support body 14 and/or the rotating body 13 may be driven by the electric motor. The configuration of the work implement 12 may be changed. For example, the work implement 12 is not limited to the bucket 19 and may include another loading attachment such as a grapple, a fork, a lifting magnet, or the like.

The conveyance vehicle 2 may be a vehicle other than the dump truck. The configuration of the conveyance vehicle 2 is not limited to that of the above embodiment and may be changed. For example, the conveyance vehicle 2 may be a vehicle driven by an electric motor. For example, the traveling body 52 and/or the bed 53 may be driven by the electric motor. The bed 53 of the conveyance vehicle 2 may not be rotatable. The traveling body 52 of the conveyance vehicle 2 may include tires instead of the crawler belts.

The configurations of the sensors included in the work machine 1 and the conveyance vehicle 2 are not limited to those of the above embodiment and may be changed. For example, the topography sensor 35 may be disposed in a part other than the side part of the rotating body 13. The topography sensor 35 is not limited to the LIDAR device and may be another sensing device such as a radar device or the like. Alternatively, the topography sensor 35 may be a camera and the controller 27 may recognize the topography by analyzing the images captured by the camera.

In the above embodiment, the controller 27 calculates the loading amount with the load data detected by the load sensors 32*a* to 32*c*. However, the controller 27 may calculate the loading amount based on the images of the bed 53 indicated by the first image data.

The controller 27 of the work machine 1 is not limited to one unit and may be divided into a plurality of controllers. The process executed by the controller 27 may be distributed and executed among the plurality of controllers. In such a case, a portion of the plurality of controllers may be disposed outside the work machine 1.

The controller 61 of the conveyance vehicle 2 is not limited to one unit and may be divided into a plurality of controllers. The process executed by the controller 61 may be distributed and executed among the plurality of controllers. In such a case, a portion of the plurality of controllers may be disposed outside the conveyance vehicle 2.

The controller 27 of the work machine 1 and the controller 61 of the conveyance vehicle 2 may communicate with each other via another controller instead of directly communicating with each other. The process of the automatic control mode executed by the controller 27 is not limited to that of the aforementioned embodiment and may be changed.

For example, the process of determining the target stop position P1 may be executed by a remote controller disposed outside the work machine 1 and the conveyance vehicle 2 or by the controller 61 of the conveyance vehicle 2. The process of determining the allowable stop range A1 may be executed by the remote controller or the controller 61 of the conveyance vehicle 2. The determination as to whether the conveyance vehicle 2 is positioned in the entry prohibition area A2 or A3 may be performed by the remote controller or the controller 27 of the work machine 1. The determination as to whether the deviation distance D1 of the conveyance vehicle 2 from the target travel route R1 is greater than the predetermined threshold may be executed by the remote controller or the controller 27 of the work machine 1. The determination of the target rotation angle of the bed 53 may be executed by the remote controller or the controller 27 of the work machine 1.

In the above embodiment, the target stop position is given from the work machine 1 to the conveyance vehicle 2. In addition to the target stop position, information related to a stop direction of the conveyance vehicle 2 may be given to the conveyance vehicle 2. Since the bucket 19 of the work machine 1 moves between the digging position L1 and the target stop position P1 by the rotating operation, it is preferable that the front part of the conveyance vehicle 2 is not present in the moving range of the bucket 19. Thus, giving the stop direction of the conveyance vehicle 2 to the conveyance vehicle 2 in advance to appropriately stop the conveyance vehicle 2 can reduce the influence on the loading operation by the conveyance vehicle 2. This is particularly effective for the conveyance vehicle 2 including a stationary bed that does not rotate.

According to the present invention, it is possible to perform the loading work onto the conveyance vehicle by the work machine with the automatic control and appropriately coordinate the work machine and the conveyance vehicle.

The invention claimed is:

1. A system comprising:
a conveyance vehicle; and
a work machine that loads materials onto the conveyance vehicle, the work machine including
a first position sensor configured to detect a position of the work machine, and
a first processor configured to
acquire data indicative of the position of the work machine detected by the first position sensor,
acquire data indicative of a target offset distance of the conveyance vehicle with respect to the work machine,
acquire data indicative of a direction of a loading position of the materials with respect to the work machine, and
determine a target stop position of the conveyance vehicle based on the position of the work machine, the target offset distance, and the direction of the loading position, and
the conveyance vehicle including
a communication device configured to communicate with the work machine,
a second position sensor configured to detect a position of the conveyance vehicle, and
a second processor configured to
acquire data indicative of the target stop position from the work machine,
acquire data indicative of the position of the conveyance vehicle detected by the second position sensor, and
control the conveyance vehicle to move the conveyance vehicle to the target stop position.

2. The system according to claim 1, wherein
the first processor is further configured to
acquire data indicative of an allowable stop range including the target stop position,
determine whether a stop position of the conveyance vehicle is in the allowable stop range, and
control the work machine to start loading the materials onto the conveyance vehicle when the stop position of the conveyance vehicle is in the allowable stop range.

3. The system according to claim 2, wherein
the first processor is further configured to determine the allowable stop range based on a distance from the work machine.

4. The system according to claim 2, wherein
the work machine further includes
a rotating body,
a support body that rotatably supports the rotating body, and
a topography sensor arranged at the rotating body and configured to measure a topography to be dug, and
the first processor is further configured to determine the allowable stop range based on a position of the topography to be dug.

5. The system according to claim 1, wherein
the second processor is further configured to
acquire data indicative of an entry prohibition area of the conveyance vehicle,
determine whether the conveyance vehicle is positioned in the entry prohibition area, and
transmit a stop command to stop automatic control by the work machine to the first processor when the conveyance vehicle is positioned in the entry prohibition area.

6. The system according to claim 1, wherein
the second processor is further configured to
acquire a target travel route from a current position of the conveyance vehicle to the target stop position,
determine whether a distance that the conveyance vehicle has deviated from the target travel route is greater than a predetermined threshold, and
transmit a stop command to stop the automatic control by the work machine to the first processor when the distance that the conveyance vehicle has deviated from the target travel route is greater than the predetermined threshold.

7. The system according to claim 1, wherein
the conveyance vehicle further includes
a traveling body, and
a bed rotatably supported with respect to the traveling body, and
the second processor is further configured to
acquire data indicative of the position of the work machine, and
control a rotation angle of the bed with respect to the traveling body based on the position of the work machine and the position of the conveyance vehicle.

8. The system according to claim 7, wherein
the second processor is further configured to control the rotation angle of the bed with respect to the traveling body so that the bed faces a direction connecting a rotation center of the bed and the position of the work machine.

9. A method executed by one or more processors for controlling a conveyance vehicle and a work machine that loads materials onto the conveyance vehicle, the method comprising:
acquiring data indicative of a position of the work machine;
acquiring data indicative of a target offset distance of the conveyance vehicle with respect to the work machine;
acquire data indicative of a direction of a loading position of the materials with respect to the work machine;
determining a target stop position of the conveyance vehicle based on the position of the work machine, the target offset distance, and the direction of the loading position;
acquiring data indicative of a position of the conveyance vehicle; and
controlling the conveyance vehicle to move the conveyance vehicle to the target stop position.

10. The method according to claim 9, wherein
data indicative of the target stop position is transmitted from the work machine to the conveyance vehicle.

11. The method according to claim 9, further comprising:
acquiring data indicative of an allowable stop range including the target stop position;
determining whether a stop position of the conveyance vehicle is in the allowable stop range; and
controlling the work machine to start loading the materials onto the conveyance vehicle when the stop position of the conveyance vehicle is in the allowable stop range.

12. The method according to claim 11, wherein
the allowable stop range is determined based on a distance from the work machine.

13. The method according to claim 11, wherein
the work machine further includes
a rotating body,
a support body that rotatably supports the rotating body, and
a topography sensor arranged at the rotating body and configured to measure a topography to be dug, and
the allowable stop range is determined based on a position of the topography to be dug.

14. The method according to claim 10, further comprising:
acquiring data indicative of an entry prohibition area of the conveyance vehicle;
determining whether the conveyance vehicle is positioned in the entry prohibition area; and
transmitting a stop command to stop automatic control by the work machine to the work machine when the conveyance vehicle is positioned in the entry prohibition area.

15. The method according to claim 9, further comprising:
acquiring a target travel route from a current position of the conveyance vehicle to the target stop position;
determining whether a distance that the conveyance vehicle has deviated from the target travel route is greater than a predetermined threshold; and
transmitting a stop command to stop the automatic control by the work machine to the work machine when the distance that the conveyance vehicle has deviated from the target travel route is greater than the predetermined threshold.

16. The method according to claim 9, wherein
the conveyance vehicle further includes
a traveling body, and
a bed rotatably supported with respect to the traveling body, the method further comprising:
controlling a rotation angle of the bed with respect to the traveling body based on the position of the work machine and the position of the conveyance vehicle.

17. The method according to claim 16, wherein
the rotation angle of the bed with respect to the traveling body is controlled so that the bed faces a direction connecting a rotation center of the bed and the position of the work machine.

18. A work machine comprising:
a first position sensor configured to detect a position of the work machine;
a first processor configured to
acquire data indicative of the position of the work machine detected by the first position sensor,
acquire data indicative of a target offset distance of the conveyance vehicle with respect to the work machine,
acquire data indicative of a direction of a loading position of the materials with respect to the work machine, and
determining a target stop position of the conveyance vehicle based on the position of the work machine, the target offset distance, and the direction of the loading position; and
a communication device configured to transmit the target stop position to the conveyance vehicle.

* * * * *